United States Patent
Lee et al.

(10) Patent No.: US 11,470,473 B2
(45) Date of Patent: Oct. 11, 2022

(54) MEDIUM ACCESS CONTROL SECURITY

(71) Applicant: QUALCOMM Incorporated, San Diego, CA (US)

(72) Inventors: Soo Bum Lee, San Diego, CA (US); Linhai He, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 16/734,009

(22) Filed: Jan. 3, 2020

(65) Prior Publication Data

US 2020/0236537 A1 Jul. 23, 2020

Related U.S. Application Data

(60) Provisional application No. 62/794,454, filed on Jan. 18, 2019.

(51) Int. Cl.
*G06F 21/00* (2013.01)
*H04W 12/037* (2021.01)
(Continued)

(52) U.S. Cl.
CPC ......... *H04W 12/037* (2021.01); *H04L 9/3242* (2013.01); *H04W 12/041* (2021.01);
(Continued)

(58) Field of Classification Search
CPC . H04W 12/037; H04W 12/041; H04W 12/08; H04W 12/06; H04W 80/02;
(Continued)

(56) References Cited

U.S. PATENT DOCUMENTS

| | | | |
|---|---|---|---|
| 8,880,869 B1 * | 11/2014 | Shah | H04L 45/72 |
| | | | 713/181 |
| 2005/0135295 A1 * | 6/2005 | Walton | H04W 74/06 |
| | | | 370/328 |

(Continued)

FOREIGN PATENT DOCUMENTS

| | | |
|---|---|---|
| EP | 3393159 A1 | 10/2018 |
| WO | 2018127985 A1 | 7/2018 |

(Continued)

OTHER PUBLICATIONS

International Search Report and Written Opinion—PCT/US2020/012365—ISA/EPO—dated Mar. 25, 2020.

*Primary Examiner* — Kendall Dolly

(74) *Attorney, Agent, or Firm* — Robert A. Reid

(57) ABSTRACT

Various aspects of the present disclosure generally relate to wireless communication. In some aspects, a user equipment (UE) may transmit to a base station (BS), information indicating a medium access control (MAC) security capability of the UE. The UE may receive from the BS, a communication that includes an indication of a MAC security configuration for communications between the UE and the BS. The indication of the MAC security configuration may be based at least in part on the MAC security capability of the UE. Numerous other aspects are provided.

38 Claims, 12 Drawing Sheets

(51) Int. Cl.
*H04W 12/08* (2021.01)
*H04W 12/06* (2021.01)
*H04L 9/32* (2006.01)
*H04W 12/041* (2021.01)
*H04L 5/00* (2006.01)
*H04W 80/02* (2009.01)

(52) U.S. Cl.
CPC ........... *H04W 12/06* (2013.01); *H04W 12/08* (2013.01); *H04L 5/0007* (2013.01); *H04W 80/02* (2013.01)

(58) Field of Classification Search
CPC ........... H04W 12/106; H04W 12/0471; H04W 12/03; H04L 9/3242; H04L 5/0007; H04L 2209/80; H04L 9/0866; H04L 63/0435; H04L 69/24
See application file for complete search history.

(56) References Cited

U.S. PATENT DOCUMENTS

| | | | | |
|---|---|---|---|---|
| 2007/0201424 A1* | 8/2007 | Kobayashi | ............ | H04W 12/02 370/349 |
| 2010/0095123 A1* | 4/2010 | He | ............ | H04L 9/0844 713/171 |
| 2010/0115275 A1* | 5/2010 | Suh | ............ | H04L 63/205 713/168 |
| 2011/0170530 A1* | 7/2011 | Akiyoshi | ............ | H04W 48/08 370/338 |
| 2012/0224552 A1* | 9/2012 | Feuersanger | ............ | H04L 5/0064 370/329 |
| 2013/0310006 A1* | 11/2013 | Chen | ............ | H04L 63/061 455/411 |
| 2014/0228027 A1* | 8/2014 | Kuo | ............ | H04W 24/10 455/436 |
| 2015/0058954 A1* | 2/2015 | Shah | ............ | H04L 9/40 726/7 |
| 2015/0350989 A1* | 12/2015 | Himayat | ............ | H04W 36/0066 370/331 |
| 2017/0202033 A1* | 7/2017 | Lee | ............ | H04W 12/041 |
| 2017/0264439 A1* | 9/2017 | Muhanna | ............ | H04W 12/02 |
| 2019/0082367 A1* | 3/2019 | Lin | ............ | H04W 36/0038 |
| 2019/0174311 A1* | 6/2019 | Hayashi | ............ | H04L 9/0866 |
| 2019/0238345 A1* | 8/2019 | Gage | ............ | H04L 9/0833 |
| 2019/0253895 A1* | 8/2019 | Xu | ............ | H04W 36/0038 |
| 2019/0297530 A1* | 9/2019 | Ohta | ............ | H04L 47/34 |
| 2019/0387404 A1* | 12/2019 | Chen | ............ | H04W 12/04 |
| 2020/0288319 A1* | 9/2020 | Pham Van | ............ | H04W 12/10 |

FOREIGN PATENT DOCUMENTS

| | | | | |
|---|---|---|---|---|
| WO | 2018144248 A1 | 8/2018 | | |
| WO | WO-2018144248 A1 * | 8/2018 | ........... | H04L 63/061 |

* cited by examiner

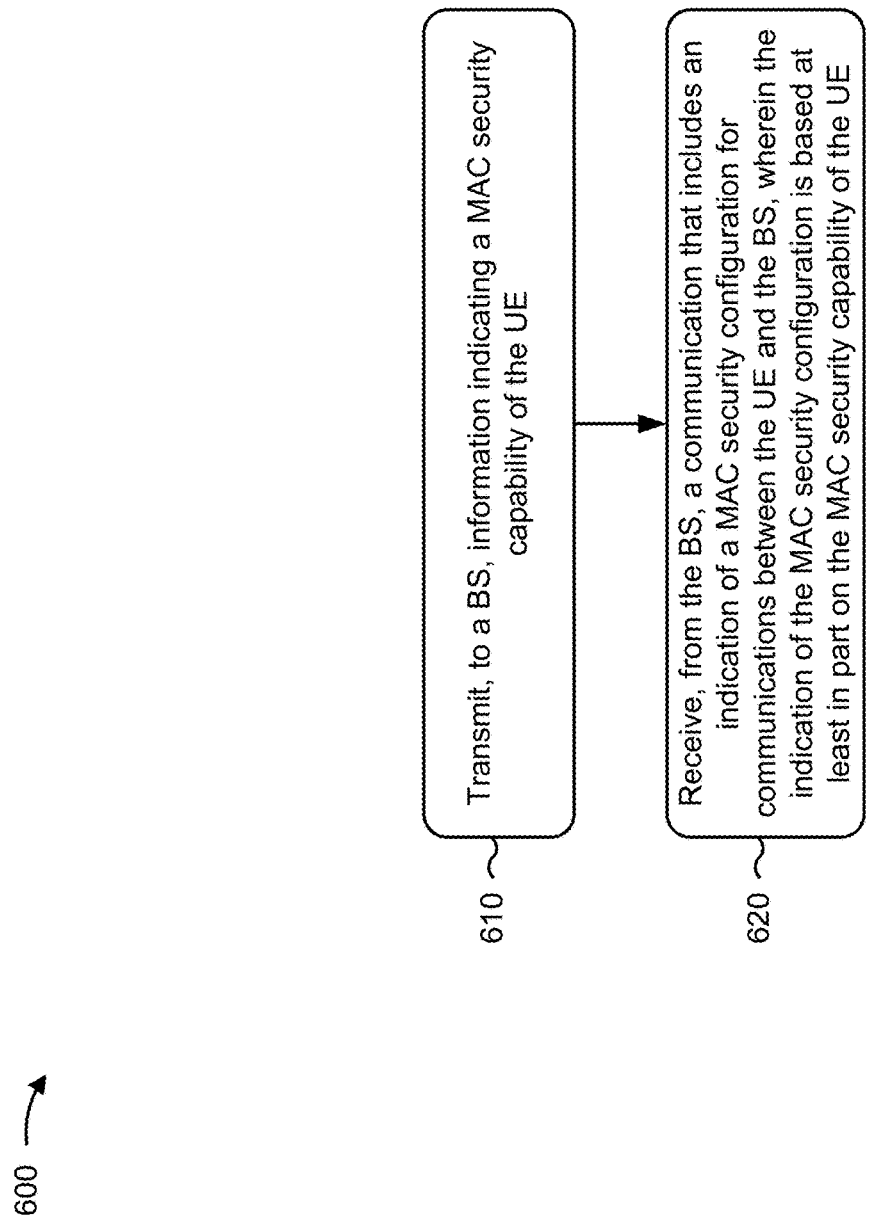

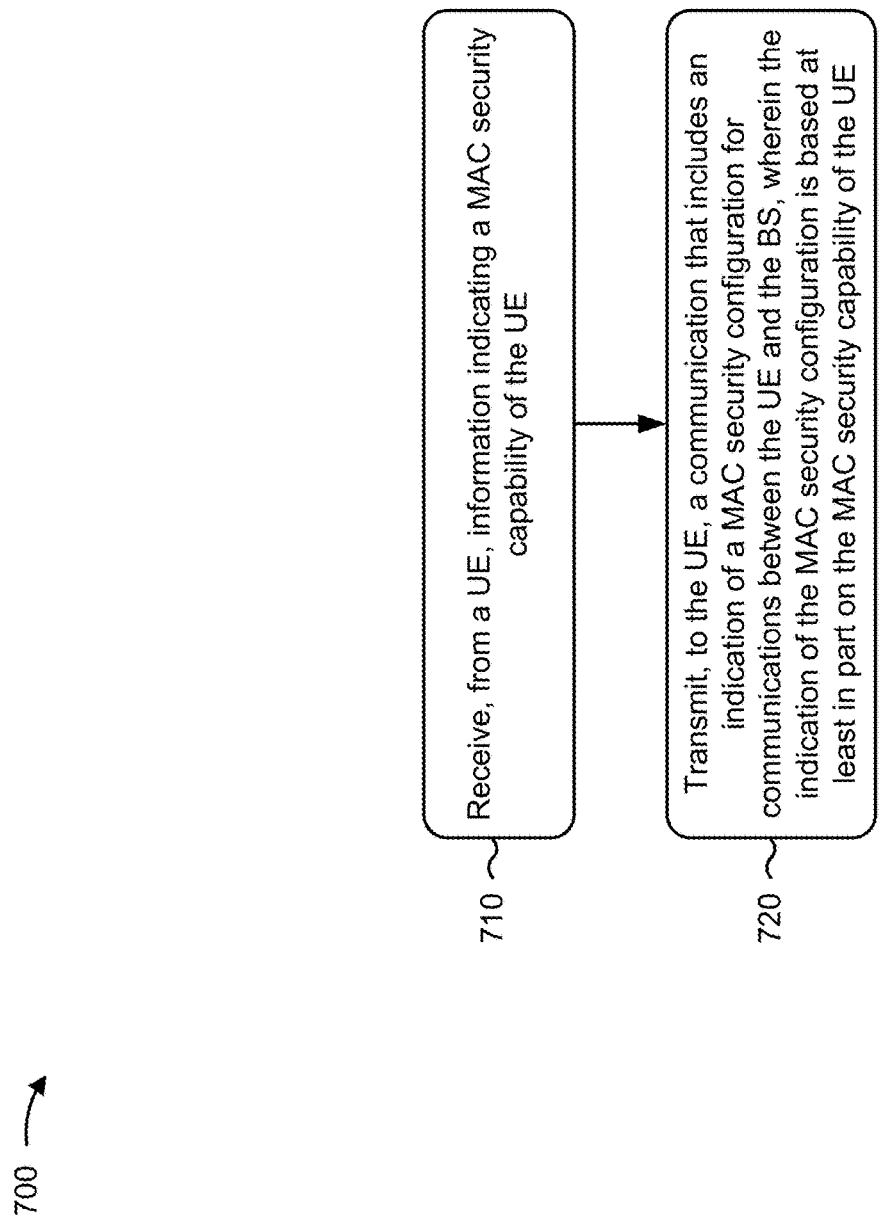

MEDIUM ACCESS CONTROL SECURITY

CROSS-REFERENCE TO RELATED APPLICATION

This application claims priority to U.S. Provisional Patent Application No. 62/794,454, filed on Jan. 18, 2019, entitled "MEDIUM ACCESS CONTROL SECURITY," which is hereby expressly incorporated by reference herein.

FIELD OF THE DISCLOSURE

Aspects of the present disclosure generally relate to wireless communication, and to techniques and apparatuses for medium access control (MAC) security.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a user equipment (UE), may include transmitting, to a base station (BS), information indicating a medium access security (MAC) security capability of the UE. The method may include receiving, from the BS, a communication that includes an indication of a MAC security configuration for communications between the UE and the BS, wherein the indication of the MAC security configuration is based at least in part on the MAC security capability of the UE.

In some aspects, a UE for wireless communication may include memory and one or more processors operatively coupled to the memory. The memory and the one or more processors may be configured to transmit, to a BS, information indicating a MAC security capability of the UE. The memory and the one or more processors may be configured to receive, from the BS, a communication that includes an indication of a MAC security configuration for communications between the UE and the BS, wherein the indication of the MAC security configuration is based at least in part on the MAC security capability of the UE.

In some aspects, a non-transitory computer-readable medium may store one or more instructions for wireless communication. The one or more instructions, when executed by one or more processors of a UE, may cause the one or more processors to transmit, to a BS, information indicating a MAC security capability of the UE. The one or more instructions, when executed by one or more processors of a UE, may cause the one or more processors to receive, from the BS, a communication that includes an indication of a MAC security configuration for communications between the UE and the BS, wherein the indication of the MAC security configuration is based at least in part on the MAC security capability of the UE.

In some aspects, an apparatus for wireless communication may include means for transmitting, to a BS, information indicating a MAC security capability of the apparatus. The apparatus may include means for receiving, from the BS, a communication that includes an indication of a MAC security configuration for communications between the apparatus and the BS, wherein the indication of the MAC security configuration is based at least in part on the MAC security capability of the apparatus.

In some aspects, a method of wireless communication, performed by a BS, may include receiving, from a UE, information indicating a MAC security capability of the UE. The method may include transmitting, to the UE, a communication that includes an indication of a MAC security configuration for communications between the UE and the BS, wherein the indication of the MAC security configuration is based at least in part on the MAC security capability of the UE.

In some aspects, a base station for wireless communication may include memory and one or more processors operatively coupled to the memory. The memory and the one or more processors may be configured to receive, from a UE, information indicating a MAC security capability of the UE. The memory and the one or more processors may be configured to transmit, to the UE, a communication that includes an indication of a MAC security configuration for communications between the UE and the BS, wherein the indication of the MAC security configuration is based at least in part on the MAC security capability of the UE.

In some aspects, a non-transitory computer-readable medium may store one or more instructions for wireless communication. The one or more instructions, when executed by one or more processors of a base station, may cause the one or more processors to receive, from a UE, information indicating a MAC security capability of the UE.

The one or more instructions, when executed by one or more processors of a base station, may cause the one or more processors to transmit, to the UE, a communication that includes an indication of a MAC security configuration for communications between the UE and the BS, wherein the indication of the MAC security configuration is based at least in part on the MAC security capability of the UE.

In some aspects, an apparatus for wireless communication may include means for receiving, from a UE, information indicating a MAC security capability of the UE. The apparatus may include means for transmitting, to the UE, a communication that includes an indication of a MAC security configuration for communications between the UE and the apparatus, wherein the indication of the MAC security configuration is based at least in part on the MAC security capability of the UE.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a UE, in accordance with various aspects of the present disclosure.

FIG. 7 is a diagram illustrating an example process performed, for example, by a BS, in accordance with various aspects of the present disclosure.

DETAILED DESCRIPTION

Figure 1:
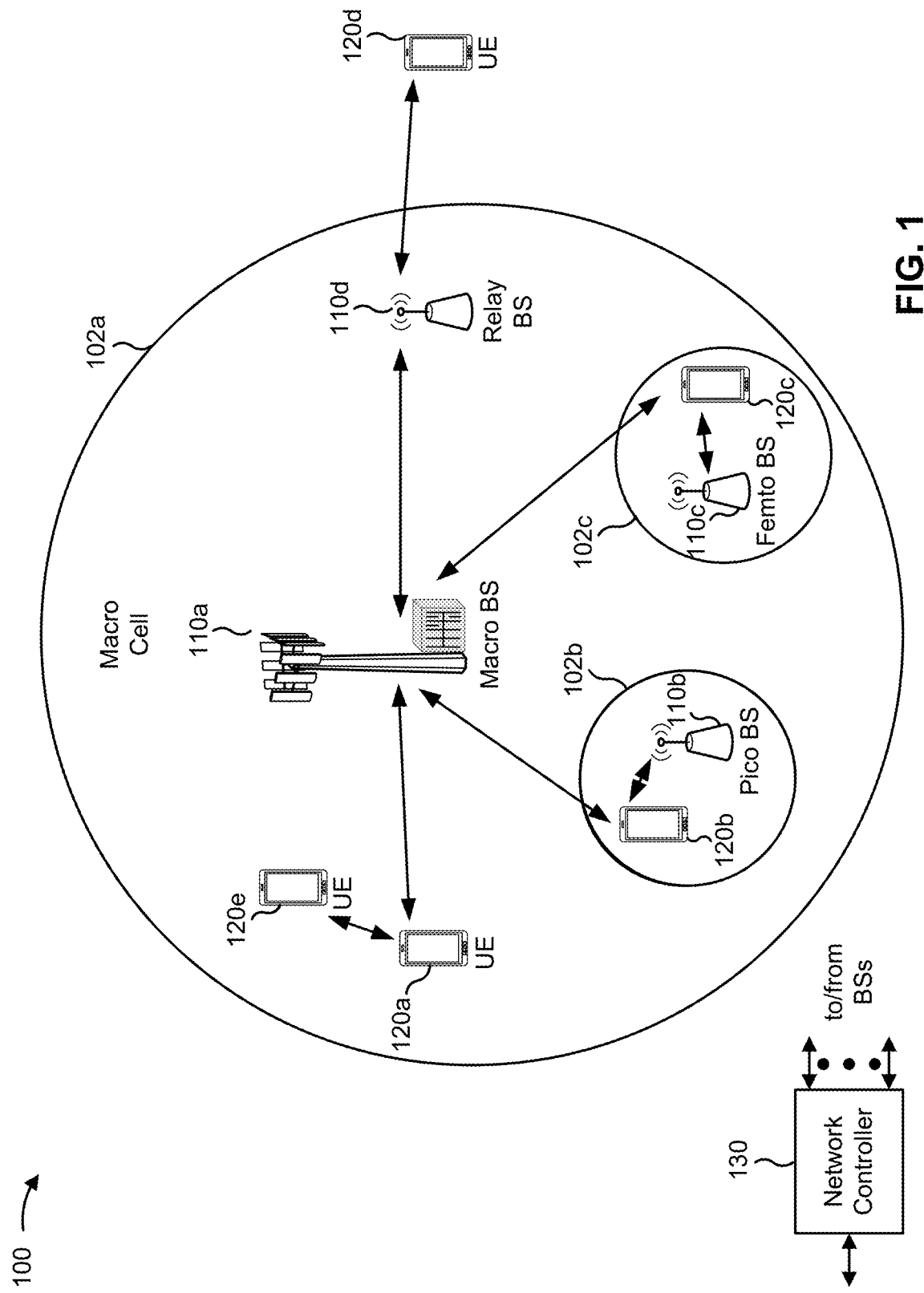
FIG. 1 is a block diagram conceptually illustrating an example of a wireless communication network, in accordance with various aspects of the present disclosure.

In a wireless network, a BS and a UE may communicate using various protocol layers, such as a packet data convergence protocol (PDCP) layer, a radio link control (RLC) layer, a medium access control (MAC) layer, and/or the like. In some cases, some of the protocol layers, such as the PDCP layer (which may be used for control plane signaling and user plane data), may be security protected using various techniques. However, some layers, such as the MAC layer, may not be security protected. Since the MAC layer may carry performance-critical information, such as buffer status reports, timing advance information, transmission configuration indication (TCI) state information, and/or the like, the lack of MAC layer security may leave the MAC layer vulnerable to attacks (e.g., denial of service (DoS) attacks, man-in-the-middle attacks, and/or other types of attacks). As a result, a malicious entity may be allowed to alter the buffer status report information (which may cause performance degradations in resource scheduling), the timing advance information (which may cause desynchronization between the UE and the BS), the TCI state information (which may cause beam and/or precoding mismatches between the UE and the BS), and/or the like.

Some aspects, described herein, provide techniques and apparatuses for MAC security. In some aspects, a UE may transmit, to a BS, an indication of a MAC security capability. The BS may transmit, to the UE, an indication of a MAC security configuration for communications between the UE and the BS. The MAC security configuration may be based at least in part on the UE's MAC security capability, and may indicate a level of MAC security that is to be used when encrypting, decrypting, and/or integrity protecting MAC protocol data units (PDUs) transmitted between the UE and the BS. Moreover, the UE and the BS may generate various keys that may be used when encrypting, decrypting, and/or integrity protecting MAC PDUs transmitted between the UE and the BS. In this way, the UE and the BS may implement MAC security for MAC PDUs transmitted between the UE and the BS, which increases the security of the MAC PDUs, prevents performance degradations and attacks of the MAC PDUs, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
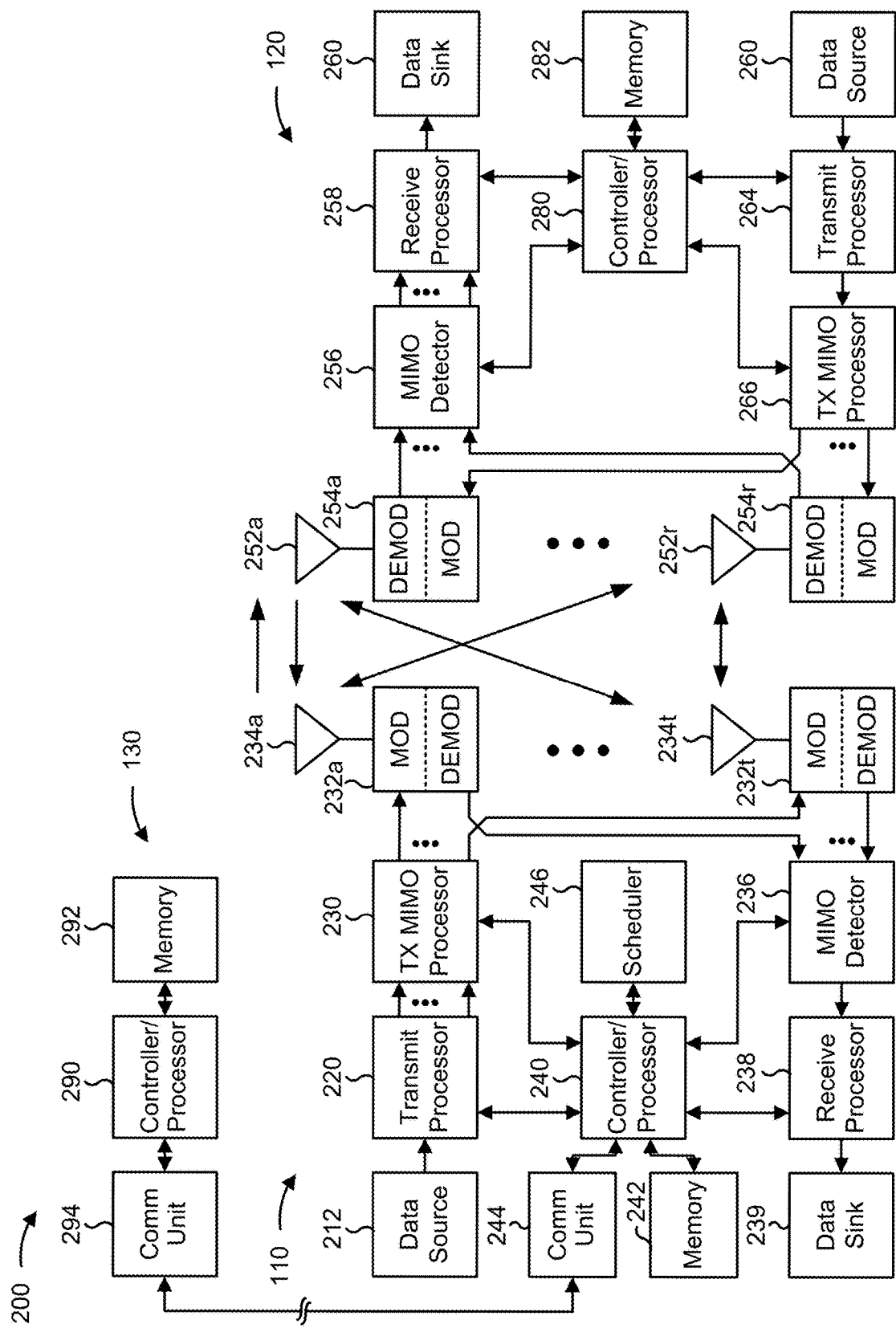
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with MAC security, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

The stored program codes, when executed by processor 280 and/or other processors and modules at UE 120, may cause the UE 120 to perform operations described with respect to process 600 of FIG. 6 and/or other processes as described herein. The stored program codes, when executed by processor 240 and/or other processors and modules at base station 110, may cause the base station 110 to perform operations described with respect to process 700 of FIG. 7 and/or other processes as described herein. A scheduler 246 may schedule UEs for data transmission on the downlink and/or uplink.

In some aspects, UE 120 may include means for transmitting, to a BS 110, information indicating a MAC security capability of the UE 120, means for receiving, from the BS 110, a communication that includes an indication of a MAC security configuration for communications between the UE 120 and the BS 110, wherein the indication of the MAC security configuration is based at least in part on the MAC security capability of the UE 120, and/or the like. In some aspects, such means may include one or more components of UE 120 described in connection with FIG. 2.

In some aspects, base station 110 may include means for receiving, from a UE 120, information indicating a MAC security capability of the UE 120, means for transmitting, to the UE 120, a communication that includes an indication of a MAC security configuration for communications between the UE 120 and the BS 110, wherein the indication of the MAC security configuration is based at least in part on the MAC security capability of the UE 120, and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3:
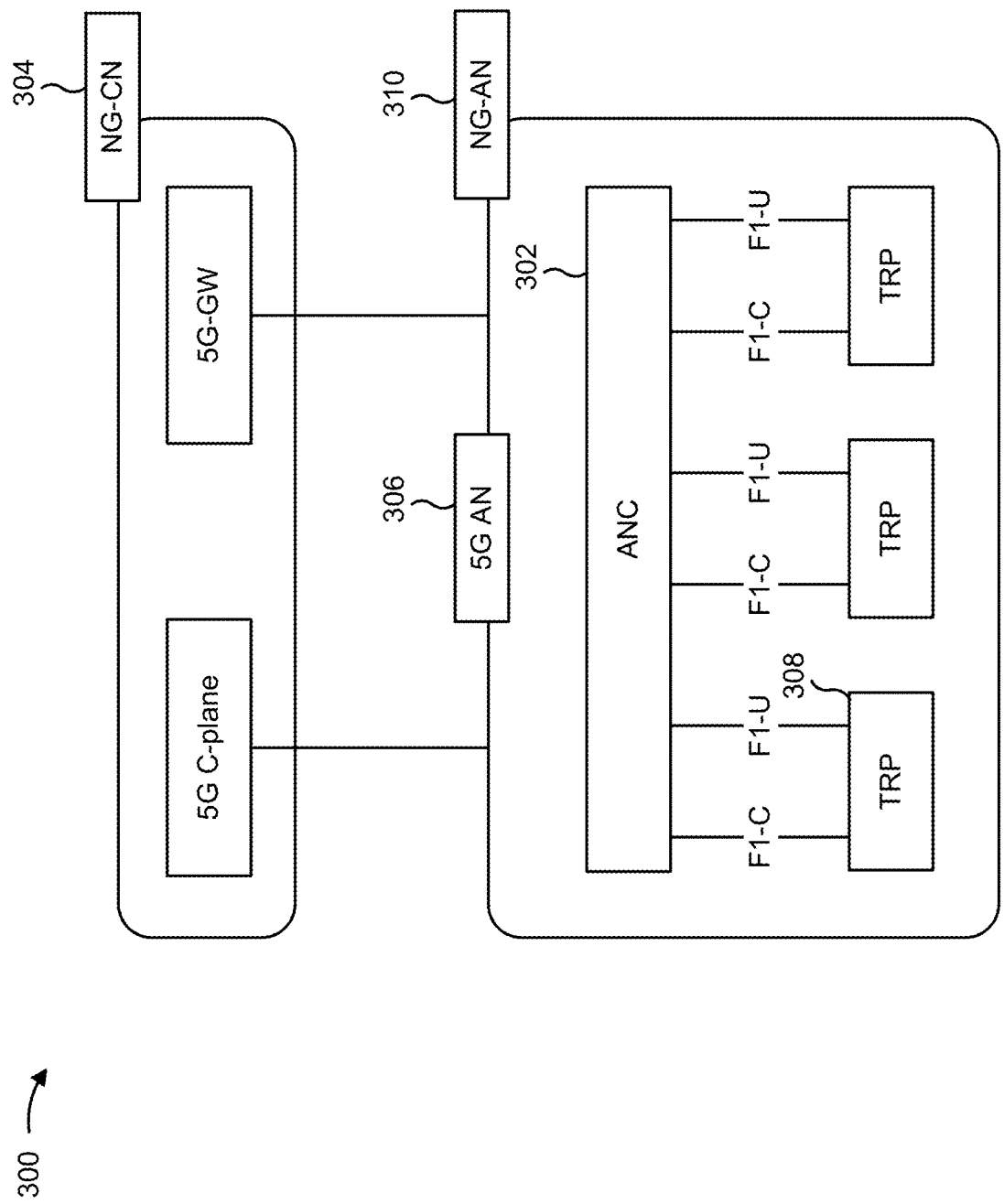
FIG. 3 illustrates an example logical architecture of a distributed radio access network (RAN), in accordance with various aspects of the present disclosure.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, gNB, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 300 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of RAN 300. The packet data convergence protocol (PDCP), radio link control (RLC), media access control (MAC) protocol may be adaptably placed at the ANC or TRP.

According to various aspects, a BS may include a central unit (CU) (e.g., ANC 302) and/or one or more distributed units (e.g., one or more TRPs 308). In some aspects, a CU of a BS may generate a BS key for various security implementations associated with the BS. The various security implementations may include encryption/decryption, integrity protection, and/or the like. In some aspects, the CU may generate one or more other keys based at least in part on the BS key, such as one or more keys for radio resource control (RRC) security at the CU and/or a DU associated with the BS, one or more keys for user plane (UP) security at the CU and/or a DU associated with the BS, one or more keys for MAC security at the CU and/or the DU associated with the BS, and/or the like. In some aspects, the CU and/or the DU may use the one or more keys, that are generated based at least in part on the BS key, to encrypt and decrypt communications with a UE, integrity protect communications with a UE, and/or the like.

As indicated above, FIG. 3 is provided merely as an example. Other examples may differ from what is described with regard to FIG. 3.

Figure 4:
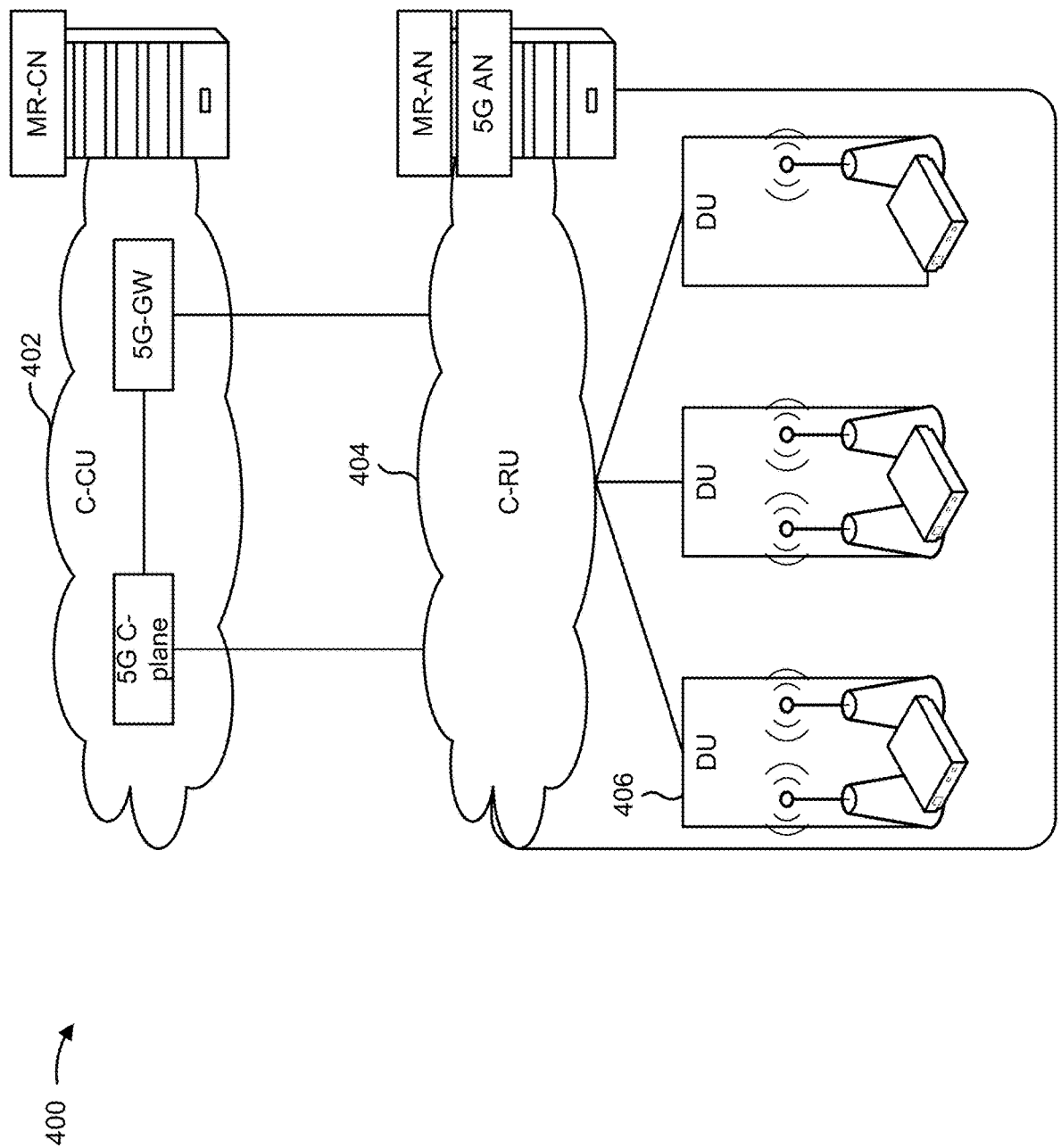
FIG. 4 illustrates an example physical architecture of a distributed RAN, in accordance with various aspects of the present disclosure.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity.

A centralized RAN unit (C-RU) 404 may host one or more ANC functions. Optionally, the C-RU may host core network functions locally. The C-RU may have distributed deployment. The C-RU may be closer to the network edge.

A distributed unit (DU) 406 may host one or more TRPs. The DU may be located at edges of the network with radio frequency (RF) functionality.

As indicated above in FIG. 3, a BS may include a central unit (CU) (e.g., C-CU 402) and/or one or more distributed units (e.g., one or more DUs 406). In some aspects, a C-CU 402 of a BS may generate a BS key for various security implementations associated with the BS. The various security implementations may include encryption/decryption, integrity protection, and/or the like. In some aspects, the C-CU 402 may generate one or more other keys based at least in part on the BS key, such as one or more keys for radio resource control (RRC) security at the C-CU 402 and/or a DU 406 associated with the BS, one or more keys for user plane (UP) security at the C-CU 402 and/or a DU 406 associated with the BS, one or more keys for MAC security at the C-CU 402 and/or the DU 406 associated with the BS, and/or the like. In some aspects, the C-CU 402 and/or the DU 406 may use the one or more keys, that are generated based at least in part on the BS key, to encrypt and decrypt communications with a UE, integrity protect communications with a UE, and/or the like.

As indicated above, FIG. 4 is provided merely as an example. Other examples may differ from what is described with regard to FIG. 4.

FIGS. 5A-5F are diagrams illustrating an example 500 of MAC security, in accordance with various aspects of the present disclosure. As shown in FIGS. 5A-5F, example 500 may include a BS 110 and a UE 120. In some aspects, BS 110 and UE 120 may be included in a wireless network (e.g., wireless network 100). In some aspects BS 110 may include a CU (e.g., a C-CU 402 or another type of CU) and one or more DUs (e.g., DU 406).

Figure 5A:
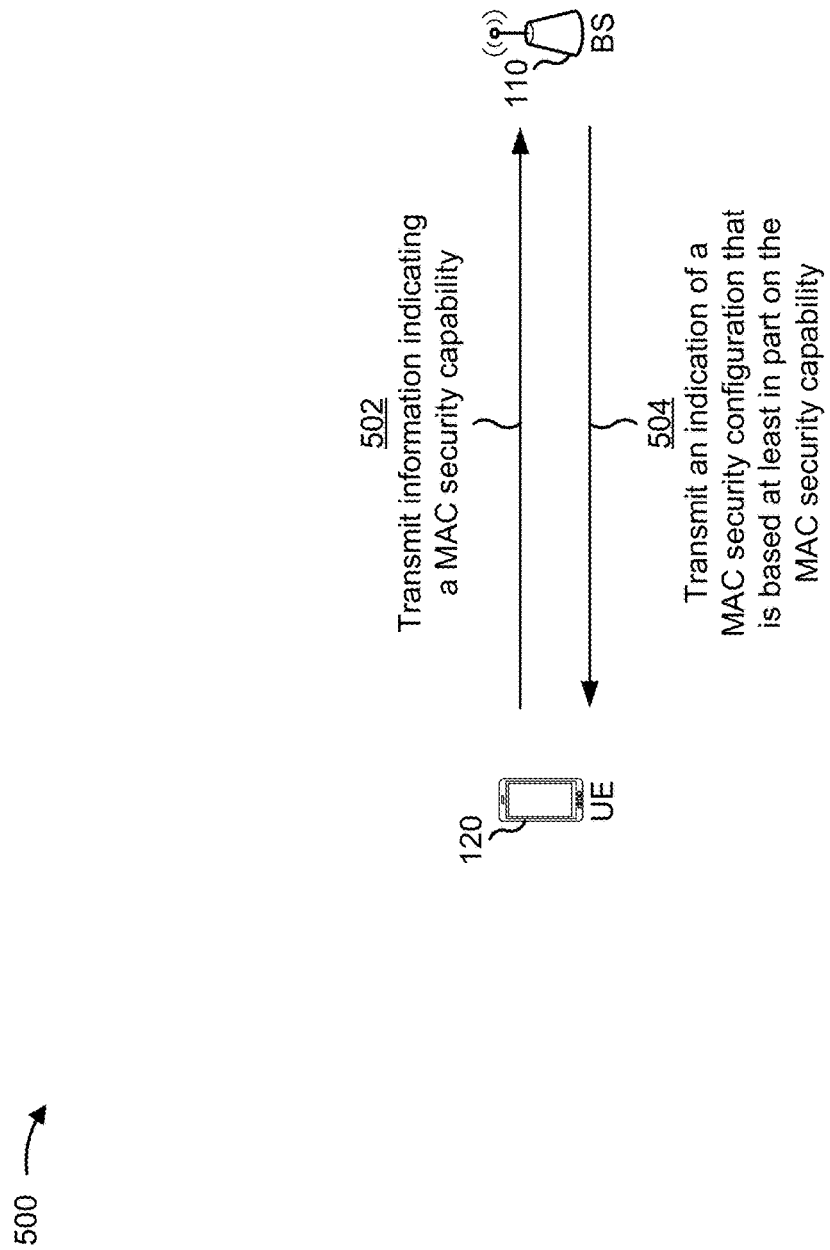
FIGS. 5A-5F are diagrams illustrating an example of MAC security, in accordance with various aspects of the present disclosure.

As shown in FIG. 5A, and by reference number 502, to initiate MAC security between BS 110 and UE 120, UE 120 may transmit, to BS 110, information indicating a MAC security capability of UE 120. In some aspects, UE 120 may transmit the information indicating the MAC security capability of UE 120 based at least in part on communicatively connecting with BS 110, based at least in part on being handed over to BS 110, and/or the like. In some aspects, the information indicating the MAC security capability of the UE may include information identifying whether UE 120 is capable of implementing MAC security at a MAC protocol data unit (PDU) level, at a MAC sub-PDU type level, at an individual MAC-control element (MAC-CE) level, and/or the like.

In some aspects, a MAC PDU may include a plurality of MAC sub-PDUs. A subset of the plurality of MAC sub-PDUs may include MAC-CEs while other MAC sub-PDUs, of the plurality of MAC sub-PDUs may include MAC service data units (SDUs) or padding (e.g., bits that are added to the MAC PDU to align the size of the MAC PDU with an expected transport block size (TBS) of the MAC PDU).

In some aspects, a MAC PDU level of MAC security may include the capability of either securing an entire MAC PDU or not securing an entire MAC PDU. In this case, UE 120 is capable of either securing all MAC sub-PDUs or no MAC sub-PDUs in a MAC PDU. In some aspects, a MAC sub-PDU type level of MAC security may include the capability of selectively securing certain types of MAC sub-PDUs, included in a MAC PDU, which reduces the overhead of applying MAC security to a MAC PDU. For example, UE 120 may be capable of selectively securing only MAC sub-PDUs that include a MAC-CE. In some aspects, a MAC-CE level of MAC security may include the capability of selectively securing particular MAC-CEs, which further reduces the overhead of applying MAC security to a MAC PDU, while increasing the flexibility of applying MAC security to the MAC PDU.

As further shown in FIG. 5A, and by reference number 504, BS 110 may transmit, to UE 120, an indication of a MAC security configuration for communications between UE 120 and BS 110. In some aspects, BS 110 may transmit the indication of the MAC security configuration based at least in part on receiving the indication of the MAC security capability of UE 120, based at least in part on a handover, of UE 120, being initiated, and/or the like. In some aspects, the handover may include an intra-BS handover, such as a handover between a first DU of BS 110 and a second DU of BS 110. In some aspects, the handover may include an inter-BS handover (which may also be referred to as an Xn-base handover), such as a handover between another BS and BS 110, a handover between a DU of another BS to a DU of BS 110, and/or the like. In some aspects, BS 110 may transmit the indication of the MAC security configuration in a RRC reconfiguration communication and/or another type of signaling communication.

In some aspects, the indication of the MAC security configuration may indicate a level of MAC security that is to be applied to MAC PDUs transmitted between UE 120 and BS 110. For example, the indication of the MAC security configuration may indicate that a MAC PDU level of MAC security is to be applied to MAC PDUs transmitted between UE 120 and BS 110, may indicate that a MAC sub-PDU type level of MAC security is to be applied to MAC PDUs transmitted between UE 120 and BS 110, or may indicate that a MAC-CE level of MAC security is to be applied to MAC PDUs transmitted between UE 120 and BS 110.

In some aspects, the indication of the MAC security configuration may be based at least in part on the MAC security capability of UE 120. For example, BS 110 may configure the indication of the MAC security configuration to match the MAC security capability of UE 120. In this way, BS 110 may configure the indication of the MAC security configuration such that the MAC security configuration is compatible with the MAC security capability of UE 120. In some aspects, the indication of the MAC security configuration may be based at least in part on other factors, such as available bandwidth on the connection between UE 120 and BS 110, based at least in part on the types of information being transmitted in a particular MAC PDU, based at least in part on BS 110 to be configured to pick the highest or lowest level of MAC security that UE 120 can support, and/or other factors.

Figure 5B:
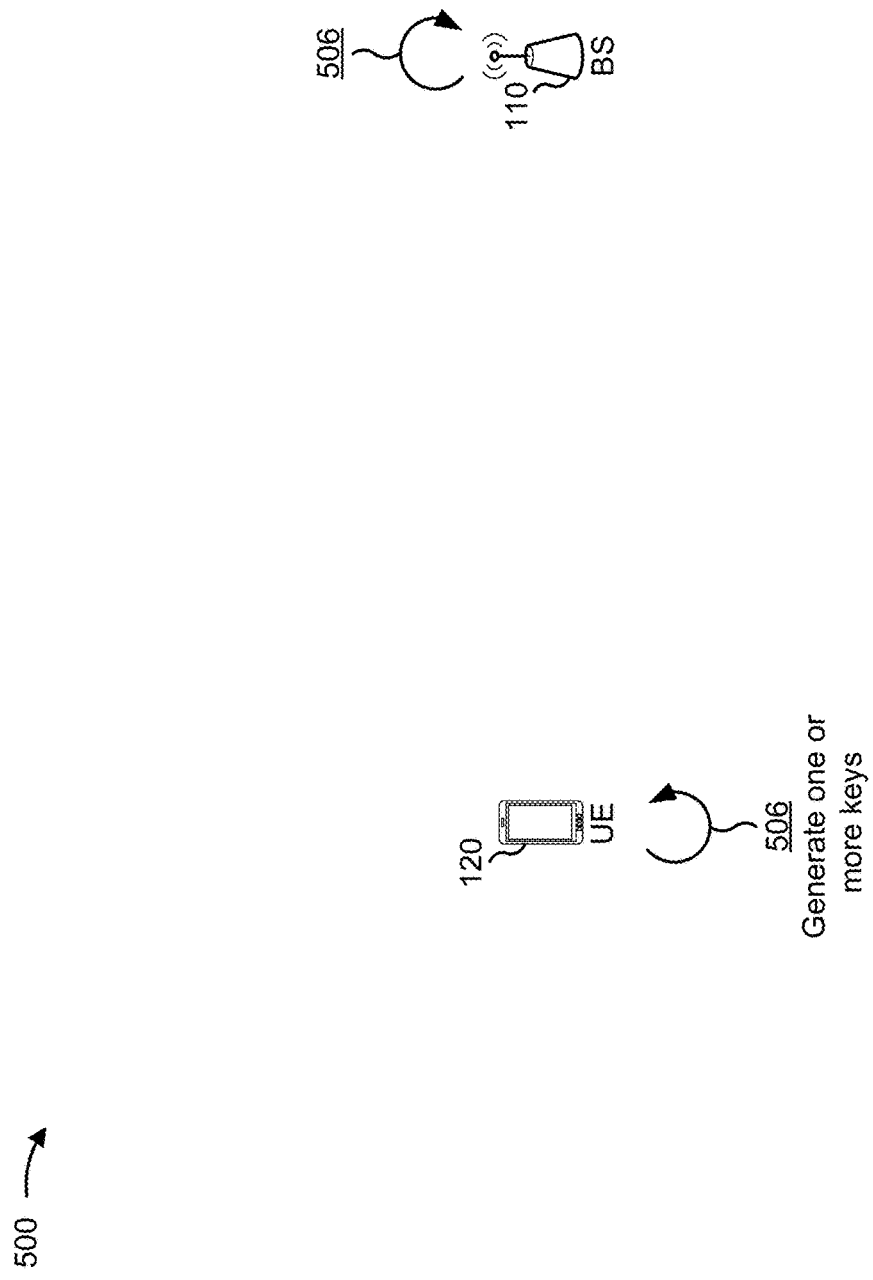

As shown in FIG. 5B, and by reference number 506, UE 120 and BS 110 may generate one or more keys. In some aspects, BS 110 may generate the one or more keys based at least in part on receiving the indication of the MAC security capability of UE 120, based at least in part on a handover, of UE 120, being initiated, and/or the like. In some aspects, UE 120 may generate the one or more keys based at least in part on receiving an indication to generate the one or more keys (e.g., in the RRC reconfiguration communication that includes the indication of the MAC security configuration), based at least in part on a handover, of UE 120, being initiated, and/or the like.

Figure 5C:
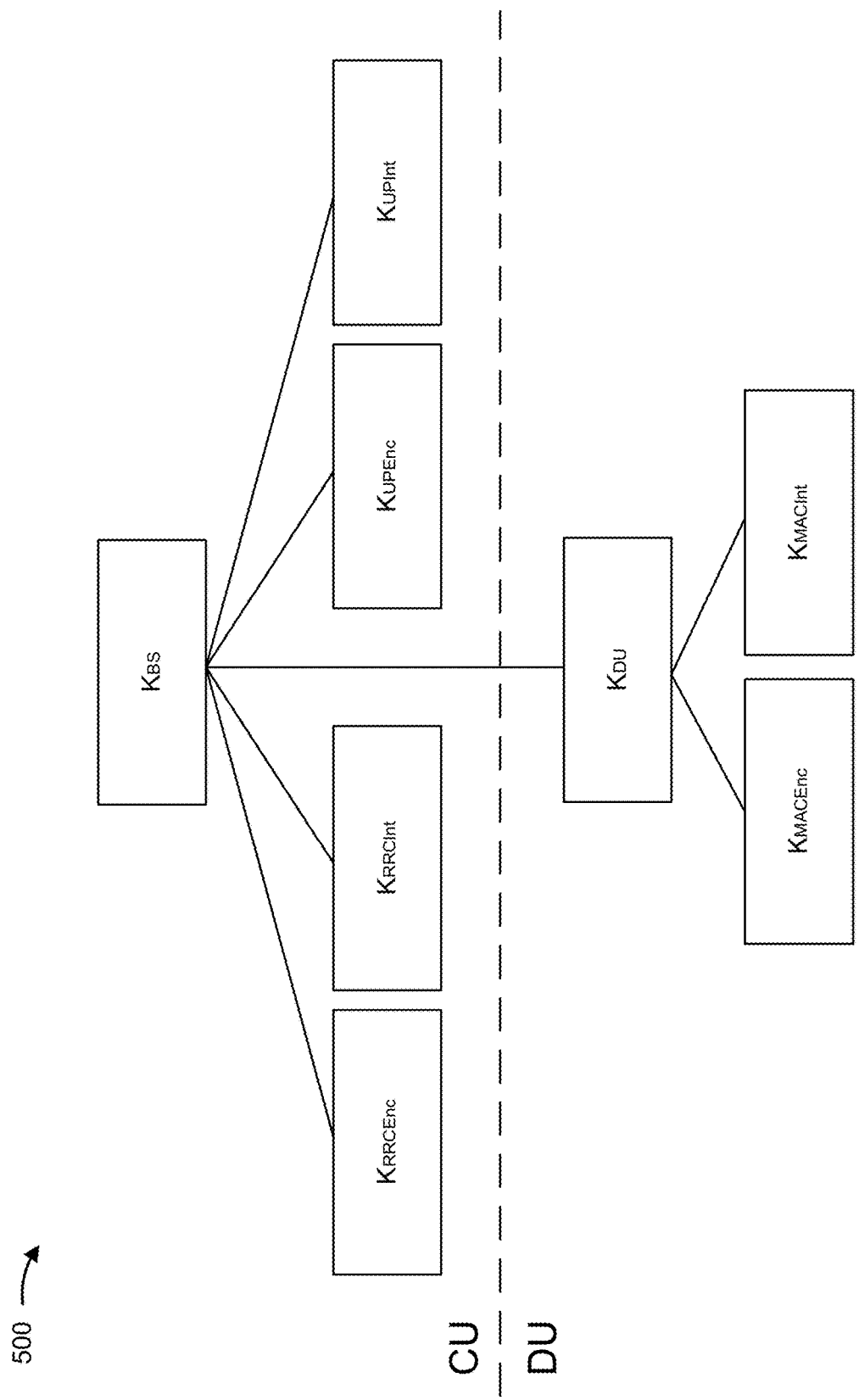
Figure 5D:
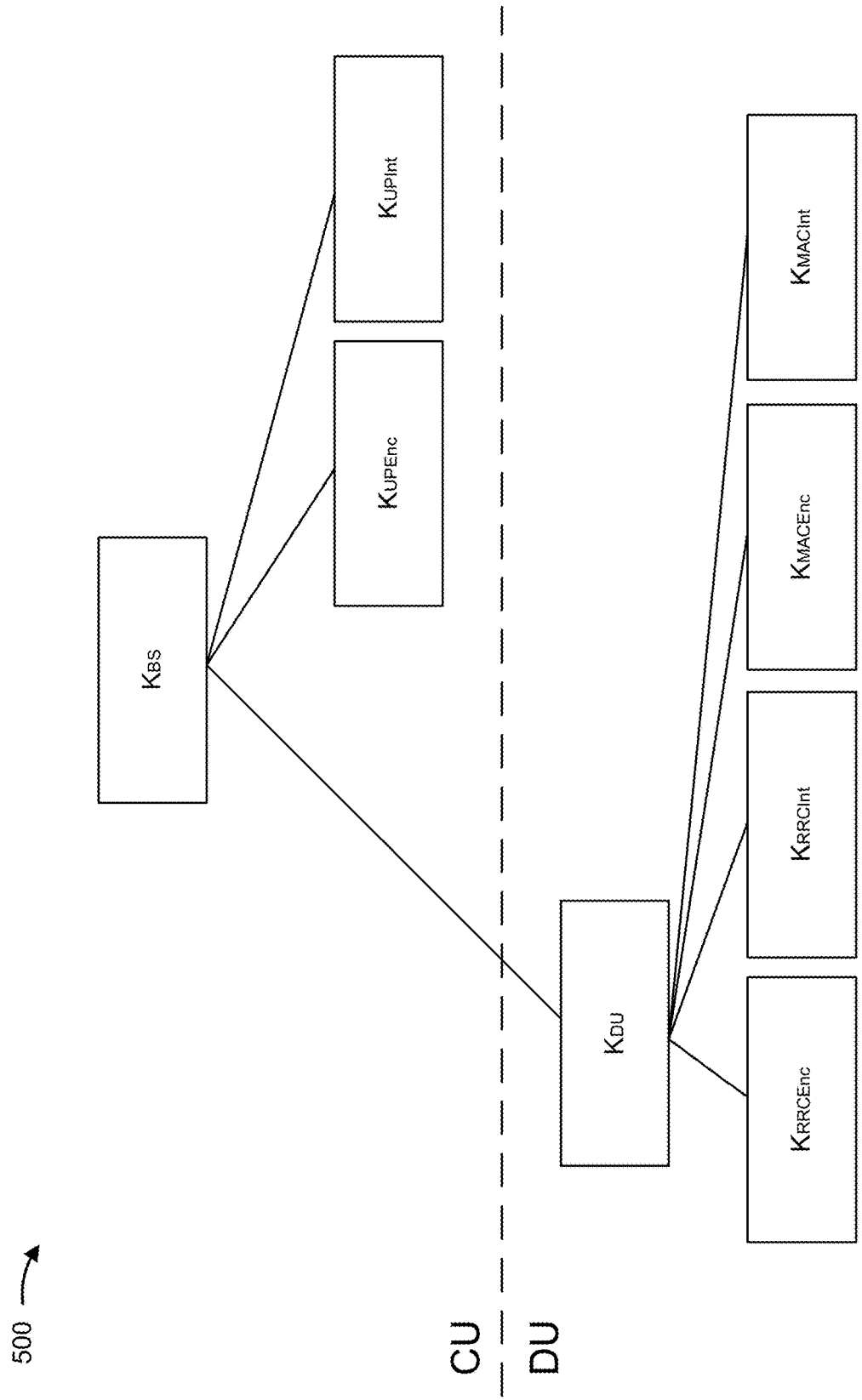
Figure 5E:
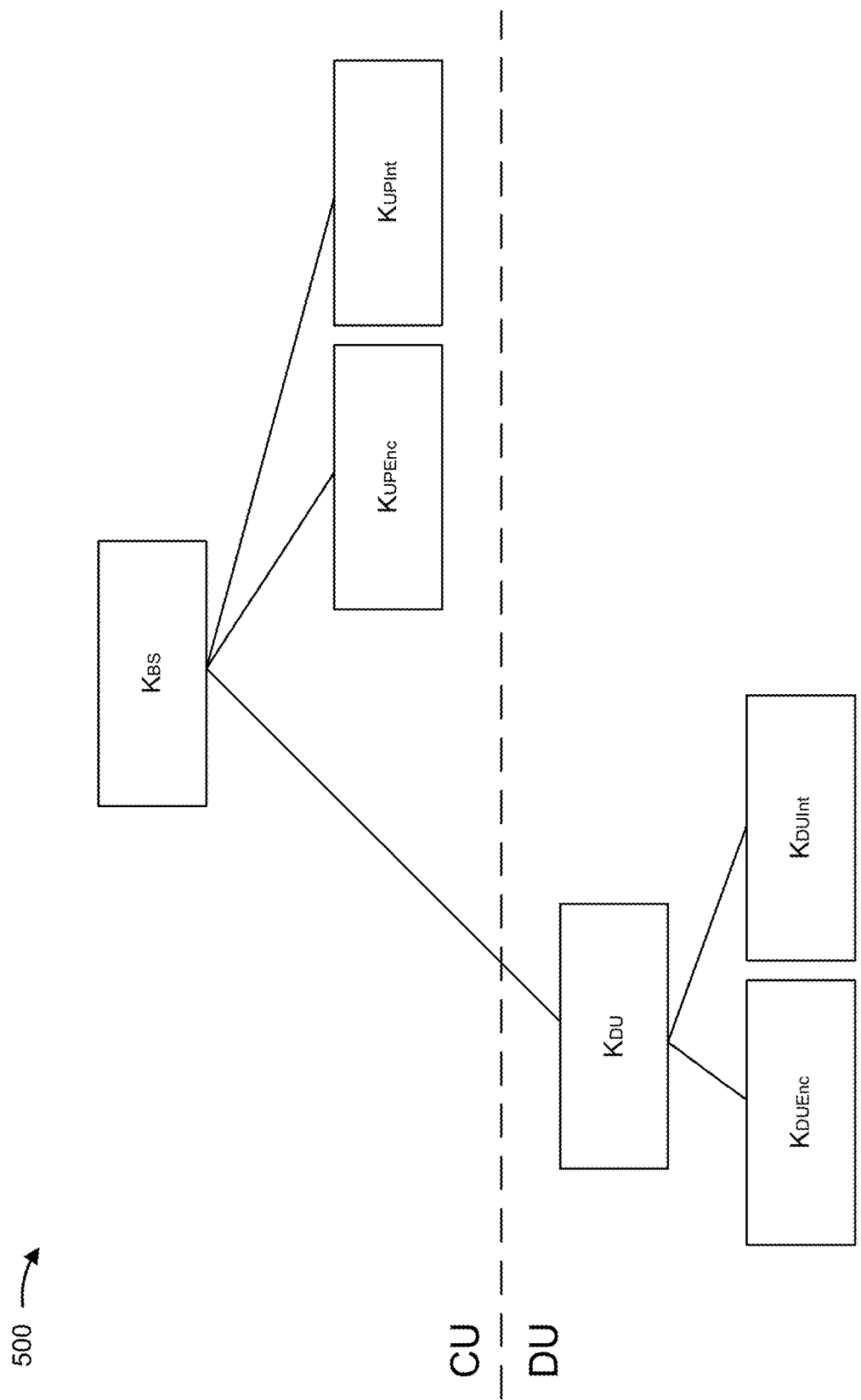

FIGS. 5C-5E illustrate various key structures for the one or more keys that may be generated by UE 120 and BS 110. As shown in FIGS. 5C-5E, UE 120 and BS 110 may generate a BS key associated with BS 110 ($K_{Bs}$), one or more sets of keys associated with a CU of BS 110, one or more keys associated with a DU of BS 110, and/or the like.

As shown in FIG. 5C, if RRC communication initiates and terminates at the CU of BS 110, the one or more sets of keys, associated with the CU, may include a set of RRC keys and a set of UP keys. The set of RRC keys may include an RRC encryption key ($K_{RRCEnc}$) and an RRC integrity key ($K_{RRCInt}$). $K_{RRCEnc}$ may be used to encrypt and decrypt RRC communications between BS 110 and UE 120, and $K_{RRCInt}$ may be used to integrity protect RRC communications between BS 110 and UE 120. The set of UP keys may include a UP encryption key ($K_{UPEnc}$) and a UP integrity key ($K_{UPInt}$). $K_{UPEnc}$ may be used to encrypt and decrypt UP communications between BS 110 and UE 120, and $K_{UPInt}$ may be used to integrity protect UP communications between BS 110 and UE 120.

As further shown in FIG. 5C, if RRC communication initiates and terminates at the CU of BS 110, the one or more sets of keys, associated with the DU, may include a DU key ($K_{DU}$) and plurality of MAC security keys. UE 120 and BS 110 may generate the plurality of MAC security keys based at least in part on $K_{DU}$. The plurality of MAC security keys may include a MAC encryption key ($K_{MACEnc}$) and a MAC integrity key ($K_{MACInt}$). UE 120 and BS 110 may use $K_{MACEnc}$, depending on the MAC security configuration indicated by BS 110, to encrypt and decrypt entire MAC PDUs, MAC sub-PDUs that include MAC-CEs, or MAC sub-PDUs that include particular MAC-CEs. UE 120 and BS 110 may use $K_{MACInt}$, depending on the MAC security configuration indicated by BS 110, to integrity protect entire MAC PDUs, MAC sub-PDUs that include MAC-CEs, or MAC sub-PDUs that include particular MAC-CEs.

In some aspects, UE 120 and BS 110 may generate $K_{RRCEnc}$, $K_{RRCInt}$, $K_{UPEnc}$, $K_{UPInt}$, and $K_{DU}$ based at least in part on $K_{BS}$. For example, UE 120 and BS 110 may generate $K_{RRCEnc}$, $K_{RRCInt}$, $K_{UPEnc}$, and $K_{UPInt}$ from $K_{BS}$ using a key derivation function as described in 3GPP TS 33.401. As another example, UE 120 and BS 110 may generate $K_{DU}$ from $K_{BS}$ using a key derivation function according to Equation 1:

$$K_{DU}=KDF(K_{BS},P_{DU},DH) \quad \text{Equation 1}$$

where $P_{DU}$ includes one or more parameters unique to the DU of BS 110, and DH includes one or more Diffie-Hellman parameters for Diffie-Hellman key generation between UE 120 and BS 110. In some aspects, UE 120 and BS 110 may generate $K_{MACEnc}$ and $K_{MACInt}$ from $K_{DU}$ in a manner similar to which $K_{RRCEnc}$, $K_{RRCInt}$, $K_{UPEnc}$, and $K_{UPInt}$ are generated from $K_{BS}$.

In some aspects, the one or more parameters unique to the DU of BS 110 may include a physical cell identifier (PCI) associated with the DU, a random number that is randomly generated by the DU, an alphanumeric string that is unique to the DU, another type of identifier that is unique to the DU, and/or any other parameters that distinguish the DU from other DUs of BS 110 and/or other DUs of other BSs included in the wireless network. In some aspects, BS 110 may transmit the one or more parameters, unique to the DU of BS 110, in the same communication that includes the indication of the MAC security configuration or in a different communication.

As shown in FIG. 5D, if RRC communication initiates and terminates at the DU of BS 110, the one or more sets of keys, associated with the CU, may include the set of UP keys ($K_{UPEnc}$ and $K_{UPInt}$). The one or more sets of keys, associated with the DU, may include the DU key ($K_{DU}$), the set of RRC keys ($K_{RRCEnc}$ and $K_{RRCInt}$), and the set of MAC security keys ($K_{MACEnc}$ and $K_{MACInt}$). In this case, UE 120 and BS 110 may generate $K_{UPEnc}$ and $K_{UPInt}$ from $K_{BS}$, may generate $K_{DU}$ based at least in part on Equation 1 above, and may generate $K_{RRCEnc}$, $K_{RRCInt}$, $K_{MACEnc}$, and $K_{MACInt}$ from $K_{DU}$.

As shown in FIG. 5E, if RRC communication initiates and terminates at the DU of BS 110, instead of having separate sets of keys for RRC communication and MAC security, UE 120 and BS 110 may generate one set of keys, from $K_{DU}$, for DU encryption ($K_{DUEnc}$) and DU integrity protection ($K_{DUInt}$). In this case, UE 120 and BS 110 may generate $K_{UPEnc}$ and $K_{UPInt}$ from $K_{BS}$, may generate $K_{DU}$ based at least in part on Equation 1 above, and may generate $K_{DUEnc}$ and $K_{DUInt}$ from $K_{DU}$. UE 120 and BS 110 may use $K_{DUEnc}$ for both RRC encryption and decryption and MAC encryption and decryption. Similarly, UE 120 and BS 110 may use $K_{DUInt}$ for both RRC integrity protection and MAC integrity protection.

Figure 5F:
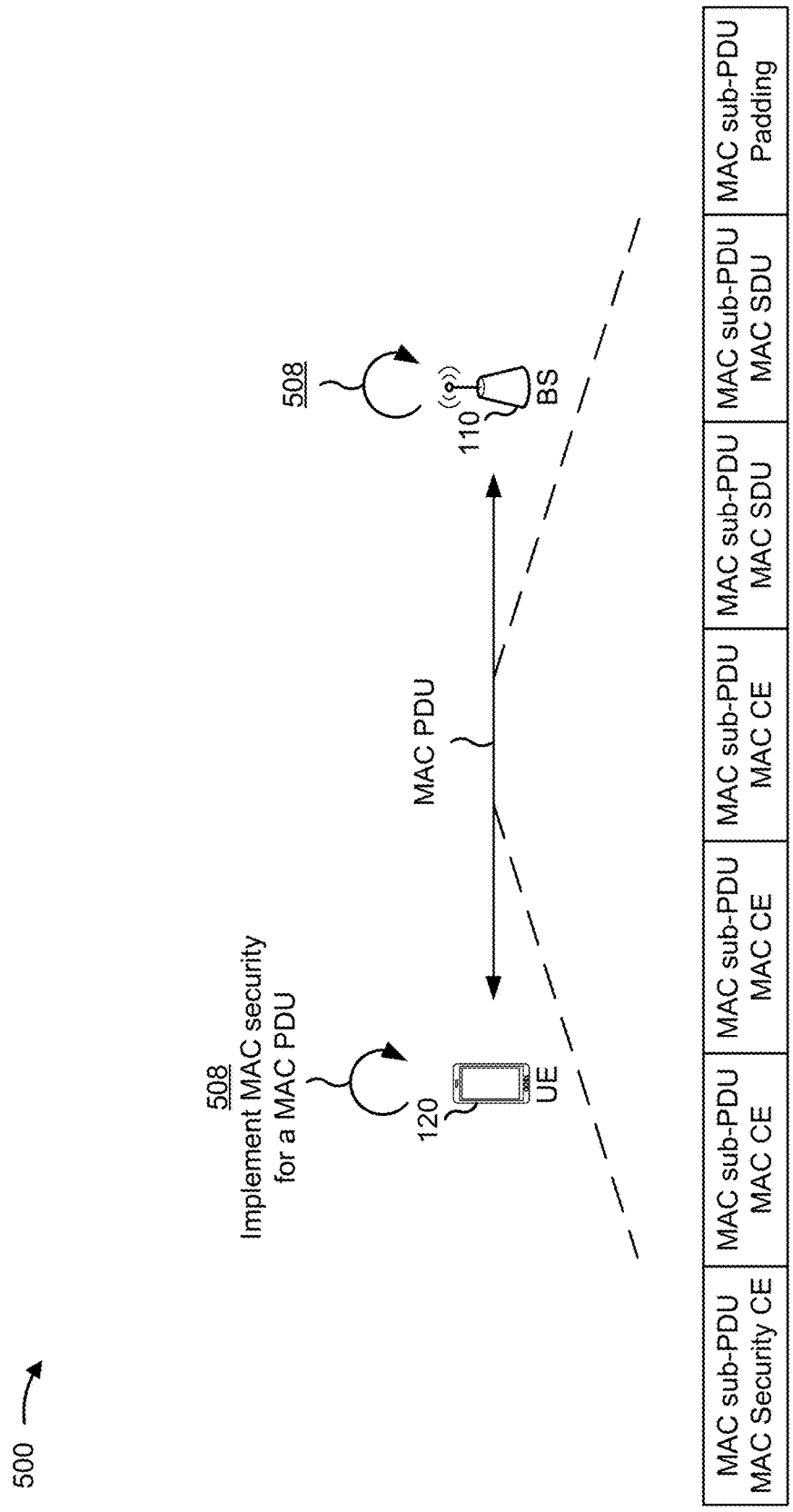

As shown in FIG. 5F, and by reference number 508, UE 120 and BS 110 may implement MAC security for a MAC PDU communication transmitted between UE 120 and BS 110. In some aspects, UE 120 and BS 110 may implement the MAC security based at least in part on the MAC security configuration indicated by BS 110, based at least in part on the one or more keys generated by UE 120 and BS 110, and/or the like.

In some aspects, UE 120 and/or a DU of BS 110 may generate a MAC PDU communication, that is to transmitted, such that the MAC PDU communication includes a plurality of MAC sub-PDUs. The plurality of MAC sub-PDUs may include a MAC security CE, one or more MAC-CEs, one or more MAC SDUs, and/or padding. In some aspects, UE 120 and/or the DU of BS 110 may configure the MAC security CE to include information associated with MAC security for the MAC PDU communication. The information associated with MAC security for the MAC PDU communication may be based at least in part on the MAC security configuration for communications between UE 120 and BS 110.

For example, if the MAC security configuration indicates that MAC security is to be used for the entire MAC PDU communication, the information associated with MAC security for the MAC PDU communication may include an indication of a length of the MAC PDU communication. UE 120 and/or the DU of BS 110 may use the indication of the length of the MAC PDU communication to determine a quantity of bits, included in the MAC PDU communication, that are to be decoded and/or integrity checked.

As another example, if the MAC security configuration indicates that MAC security is to be used for all MAC sub-PDUs that include a MAC-CE, the information associated with MAC security for the MAC PDU communication may include an indication of a quantity of all MAC sub-PDUs, included in the MAC PDU communication, that include a MAC-CE, and an indication of a combined length of all MAC sub-PDUs, included in the MAC PDU communication, that include a MAC-CE. Since the MAC sub-PDUs that include MAC-CEs may be located in a continuous block in the MAC PDU communication, UE 120 and/or the DU of BS 110 may use the indication of the combined length to identify the contiguous block of MAC sub-PDUs, and may use the indication of the quantity to determine a quantity of MAC sub-PDUs, included in the continuous block, that are to be decrypted and/or integrity checked.

As another example, if the MAC security configuration indicates that MAC security is to be used for a subset of MAC sub-PDUs that include a MAC-CE, the information associated with MAC security for the MAC PDU communication may include an indication of a quantity of MAC sub-PDUs, included in the subset of MAC sub-PDUs, may include an indication of respective identifiers associated with the subset of MAC sub-PDUs, and may include an indication of respective lengths of the subset of the MAC sub-PDUs. UE 120 and/or the DU of BS 110 may use the indication of the quantity, the indication of the respective identifiers, and the indication of the respective lengths, to identify the subset of MAC sub-PDUs that are to be decrypted and/or integrity checked.

In some aspects, the information associated with MAC security for the MAC PDU may include a MAC security sequence number associated with the MAC PDU communication. The MAC security sequence number may be particular to the MAC PDU communication and may be sequentially incremented for the transmission of each subsequent MAC PDU communication. If UE 120 and/or the DU of BS 110 receives a MAC PDU and determines that the MAC security sequence is not incremented or out of sequence relative to a previously received MAC PDU communication, UE 120 and/or the DU of BS 110 may disregard the MAC PDU communication and/or transmit an instruction for retransmission of the MAC PDU communication. In this way, if a potentially malicious entity intercepts a MAC PDU communication between UE 120 and the DU of BS 110 and tries to use the MAC PDU communication for a malicious purpose, the receiver of the MAC PDU communication (e.g., UE 120 or the DU of BS 110) may prevent the malicious purpose by first inspecting the MAC security sequence number.

In some aspects, UE 120 and/or BS 110 may further implement MAC security for the MAC PDU communication by decrypting or encrypting the MAC PDU communication using the $K_{MACEnc}$ or $K_{DUEnc}$ associated with the DU of BS 110, by integrity protecting the MAC PDU communication using the $K_{MACInt}$ or $K_{DUInt}$ associated with the DU of BS 110, and/or the like. For example, a transmitter of the MAC PDU communication (e.g., UE 120 or BS 110) may encrypt the MAC PDU communication (e.g., based at least in part on the indicated MAC security configuration) by using $K_{MACEnc}$ or $K_{DUEnc}$ in an encryption algorithm, such as an encryption algorithm specified in 3GPP TS 33.501 D.2. If $K_{DUEnc}$ is used in the encryption algorithm, the transmitter may include a MAC encryption input parameter (e.g., a value that is specific to MAC encryption) in the encryption algorithm to distinguish the encryption of the MAC PDU from encryption that is used for RRC communications. The transmitter may use the encryption algorithm to generate a keystream block, for each protected MAC sub-PDU, and may generate a cyphertext block from a plaintext block for each MAC sub-PDU based at least in part on a corresponding keystream block.

As another example, the transmitter may integrity protect the MAC PDU communication (e.g., based at least in part on the indicated MAC security configuration) by using $K_{MACInt}$ or $K_{DUInt}$ in an integrity protection algorithm, such as an integrity protection specified in 3GPP TS 33.501 D.3. If $K_{DUInt}$ is used in the integrity protection algorithm, the transmitter may include a MAC integrity protection input parameter (e.g., a value that is specific to MAC integrity protection) in the integrity protection algorithm to distinguish the integrity protection of the MAC PDU communication from integrity protection that is used for RRC communications. The transmitter may generate a message authentication code using the integrity protection algorithm, and may append the message authentication code to the MAC PDU.

The receiver may receive the MAC PDU and may decrypt the MAC PDU communication (e.g., based at least in part on the indicated MAC security configuration) by using $K_{MACEnc}$ or $K_{DUEnc}$ in a decryption algorithm, such as a decryption algorithm specified in 3GPP TS 33.501 D.2. If $K_{DUEnc}$ is used in the decryption algorithm, the receiver may include the MAC encryption input parameter in the decryption algorithm. The receiver may use the decryption algorithm to generate a keystream block, for each protected MAC sub-PDU, and may generate a plaintext block from a cyphertext block for each MAC sub-PDU based at least in part on a corresponding keystream block.

As another example, the receiver may integrity check the MAC PDU communication (e.g., based at least in part on the indicated MAC security configuration) by using $K_{MACInt}$ or $K_{DUInt}$ in an integrity protection algorithm, such as an integrity protection algorithm specified in 3GPP TS 33.501 D.3. If $K_{DUInt}$ is used in the integrity protection algorithm, the receiver may include the MAC integrity protection input parameter in the integrity protection algorithm. The receiver may generate a message authentication code using the integrity protection algorithm, and may compare the generated message authentication code with the message authentication code that is appended to the MAC PDU to determine whether the generated message authentication code is an exact match of the message authentication code.

In this way, UE 120 may transmit, to BS 110, an indication of a MAC security capability of UE 120. BS 110 may transmit, to UE 120, an indication of a MAC security configuration for communications between UE 120 and BS 110. The MAC security configuration may be based at least in part on the UE 120's MAC security capability, and may indicate a level of MAC security that is to be used when encrypting, decrypting, and/or integrity protecting MAC PDUs transmitted between UE 120 and BS 110. Moreover, UE 120 and BS 110 may generate various keys that may be used when encrypting, decrypting, and/or integrity protecting MAC PDUs transmitted between UE 120 and BS 110. In this way, UE 120 and BS 110 may implement MAC security for MAC PDUs transmitted between UE 120 and BS 110, which increases the security of the MAC PDUs, prevents performance degradations and attacks of the MAC PDUs, and/or the like.

As indicated above, FIGS. 5A-5F are provided as an example. Other examples may differ from what is described with respect to FIGS. 5A-5F.

FIG. 6 is a diagram illustrating an example process 600 performed, for example, by a UE, in accordance with various aspects of the present disclosure. Example process 600 is an example where a UE (e.g., UE 120) performs MAC security.

As shown in FIG. 6, process 600 may include transmitting, to a BS, information indicating a MAC security capability of the UE (block 610). For example, the UE (e.g., transmit processor 264, controller/processor 280, memory 282, and/or the like) may transmit, to a base station (BS), information indicating a MAC security capability of the UE, as described above.

As further shown in FIG. 6, process 600 may include receiving, from the BS, a communication that includes an indication of a MAC security configuration for communications between the UE and the BS, wherein the indication of the MAC security configuration is based at least in part on the MAC security capability of the UE (block 620). For example, the UE (e.g., using receive processor 258, controller/processor 280, memory 282, and/or the like) may receive, from the BS, a communication that includes an indication of a MAC security configuration for communications between the UE and the BS, as described above. In some aspects, the indication of the MAC security configuration is based at least in part on the MAC security capability of the UE.

Process 600 may include additional aspects, such as any single implementation or any combination of aspects described below and/or in connection with one or more other processes described elsewhere herein.

In a first aspect, the indication of the MAC security configuration comprises an indication that MAC security is to be used for an entire MAC PDU transmitted between the UE and the BS, an indication that MAC security is to be used for all MAC sub-PDUs, included in the MAC PDU, that include a MAC-CE, or an indication that MAC security is to be used for a subset of the MAC sub-PDUs, included in the MAC PDU, that include a MAC-CE. In a second aspect, alone or in combination with the first aspect, the communication includes one or more parameters unique to a DU of the BS, and process 600 comprises generating, based at least in part on the one or more parameters unique to the DU, a DU key to be used for communications between the UE and the DU.

In a third aspect, alone or in combination with one or more of the first or second aspects, generating the DU key comprises generating the DU key based at least in part on a BS key associated with the BS. In some aspects, generating the DU key comprises using the one or more parameters unique to the DU and the BS key in a key derivation function. In a fourth aspect, alone or in combination with one or more of the first through third aspects, the one or more parameters unique to the DU comprises at least one of a PCI associated with the DU, a random number that is randomly generated by the DU, or an alphanumeric string. In a fifth aspect, alone or in combination with one or more of the first through fourth aspects, process 600 comprises generating, based at least in part on the DU key, a MAC encryption key associated with the DU and a MAC integrity key associated with the DU.

In a sixth aspect, alone or in combination with one or more of the first through fifth aspects, process 600 comprises generating, based at least in part on the DU key, an RRC encryption key associated with the DU, an RRC integrity key associated with the DU, a MAC encryption key associated with the DU, and a MAC integrity key associated with the DU. In a seventh aspect, alone or in combination with one or more of the first through sixth aspects, process 600 comprises generating, based at least in part on the DU key, a DU encryption key associated with the DU and a DU integrity key associated with the DU. In an eighth aspect, alone or in combination with one or more of the first through seventh aspects, process 600 comprises decrypting an (RRC communication, received from the DU, based at least in part on a decryption algorithm in which the DU encryption key and an RRC input parameter is used, or encrypting a RRC communication, to be transmitted to the DU, based at least in part on an encryption algorithm in which the DU encryption key and the RRC input parameter is used.

In a ninth aspect, alone or in combination with one or more of the first through eighth aspects, process 600 comprises decrypting a MAC PDU communication, received from the DU, based at least in part on a decryption algorithm in which the DU encryption key and a MAC input parameter is used, or encrypting a MAC PDU communication, to be transmitted to the DU, based at least in part on an encryption algorithm in which the DU encryption key and the MAC input parameter is used.

In a tenth aspect, alone or in combination with one or more of the first through ninth aspects, process 600 comprises generating a message authentication code based at least in part on an integrity algorithm in which the DU integrity key and an RRC input parameter is used. In an eleventh aspect, alone or in combination with one or more of the first through tenth aspects, process 600 comprises generating a message authentication code based at least in part on an integrity algorithm in which the DU integrity key and a MAC input parameter is used. In a twelfth aspect, alone or in combination with one or more of the first through eleventh aspects, process 600 comprises receiving, from the BS, a MAC PDU, identifying a MAC security CE included in the MAC PDU, and identifying, based at least in part on the MAC security configuration, information, associated with MAC security of the MAC PDU, included in the MAC security CE.

In a thirteenth aspect, alone or in combination with one or more of the first through twelfth aspects, the information associated with the MAC security of the MAC PDU comprises a MAC security sequence number associated with the MAC PDU. In a fourteenth aspect, alone or in combination with one or more of the first through thirteenth aspects, the indication of the MAC security configuration comprises an indication that MAC security is to be used for all MAC sub-PDUs, included in the MAC PDU, that include a MAC-CE. In a fifteenth aspect, alone or in combination with one or more of the first through fourteenth aspects, the information associated with the MAC security of the MAC PDU comprises an indication of a quantity of all MAC sub-PDUs, included in the MAC PDU, that include a MAC-CE and an indication of a combined length of all MAC sub-PDUs, included in the MAC PDU, that include a MAC-CE.

In a sixteenth aspect, alone or in combination with one or more of the first through fifteenth aspects, the indication of the MAC security configuration comprises an indication that MAC security is to be used for an entire MAC PDU transmitted between the UE and the BS. In a seventeenth aspect, alone or in combination with one or more of the first through sixteenth aspects, the information associated with the MAC security of the MAC PDU comprises an indication of a length of the MAC PDU. In an eighteenth aspect, alone or in combination with one or more of the first through seventeenth aspects, the indication of the MAC security configuration comprises an indication that MAC security is to be used for a subset of MAC sub-PDUs, included in the MAC PDU, that include a MAC-CE. In a nineteenth aspect, alone or in combination with one or more of the first through eighteenth aspects, the information associated with the MAC security of the MAC PDU comprises an indication of a quantity of MAC sub-PDUs included in the subset of MAC sub-PDUs and an indication of a respective length of each MAC sub-PDU included in the subset of MAC sub-PDUs.

In a twentieth aspect, alone or in combination with one or more of the first through nineteenth aspects, process 600 comprises generating, for transmission to the BS, a MAC PDU, and configuring, based at least in part on the MAC security configuration, a MAC security CE included in the MAC PDU, wherein the MAC security CE includes information associated with MAC security of the MAC PDU. In a twenty-first aspect, alone or in combination with one or more of the first through twentieth aspects, the information associated with the MAC security of the MAC PDU comprises a MAC security sequence number associated with the MAC PDU.

In a twenty-second aspect, alone or in combination with one or more of the first through twenty-first aspects, the indication of the MAC security configuration comprises an indication that MAC security is to be used for all MAC sub-PDUs, included in the MAC PDU, that include a MAC-CE. In a twenty-third aspect, alone or in combination with one or more of the first through twenty-second aspects, the information associated with the MAC security of the MAC PDU comprises an indication of a quantity of all MAC sub-PDUs, included in the MAC PDU, that include a MAC-CE and an indication of a combined length of all MAC sub-PDUs, included in the MAC PDU, that include a MAC-CE. In a twenty-fourth aspect, alone or in combination with one or more of the first through twenty-third aspects, the indication of the MAC security configuration comprises an indication that MAC security is to be used for an entire MAC PDU transmitted between the UE and the BS. In a twenty-fifth aspect, alone or in combination with one or more of the first through twenty-fourth aspects, the information associated with the MAC security of the MAC PDU comprises an indication of a length of the MAC PDU.

In a twenty-sixth aspect, alone or in combination with one or more of the first through twenty-fifth aspects, the indication of the MAC security configuration comprises an indication that MAC security is to be used for a subset of MAC sub-PDUs, included in the MAC PDU, that include a MAC-CE. In a twenty-seventh aspect, alone or in combination with one or more of the first through twenty-sixth aspects, the information associated with the MAC security of the MAC PDU comprises an indication of a quantity of MAC sub-PDUs included in the subset of MAC sub-PDUs and an indication of a respective length of each MAC sub-PDU included in the subset of MAC sub-PDUs.

In a twenty-eighth aspect, alone or in combination with one or more of the first through twenty-seventh aspects, receiving the communication comprises receiving the communication based at least in part on a handover being initiated between a first DU and a second DU. In a twenty-ninth aspect, alone or in combination with one or more of the first through twenty-eighth aspects, the second DU is associated with the BS and the first DU is associated with the BS or another BS. In a thirtieth aspect, alone or in combination with one or more of the first through twenty-ninth aspects, the communication includes an indication to generate a DU key associated with the first DU. In some a thirty-first aspect, alone or in combination with one or more of the first through thirtieth aspects, process 600 comprises generating the DU key associated with the first DU based at least in part on the indication to generate the DU key associated with the first DU.

In a thirty-second aspect, alone or in combination with one or more of the first through thirty-first aspects, the handover is an Xn-based handover. In a thirty-third aspect, alone or in combination with one or more of the first through thirty-second aspects, process 600 comprises generating a BS key associated with a BS that is associated with the first DU, and generating a DU key, associated with the first DU, based at least in part on the BS key. In a thirty-fourth aspect, alone or in combination with one or more of the first through thirty-third aspects, the communication comprises an RRC reconfiguration communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a BS, in accordance with various aspects of the present disclosure. Example process 700 is an example where a BS (e.g., BS 110) performs MAC security.

As shown in FIG. 7, process 700 may include receiving, from a UE, information indicating a MAC security capability of the UE (block 710). For example, the BS (e.g., using receive processor 238, controller/processor 240, memory 242, and/or the like) may receive, from a UE, information indicating a MAC security capability of the UE, as described above.

As further shown in FIG. 7, process 700 may include transmitting, to the UE, a communication that includes an indication of a MAC security configuration for communications between the UE and the BS, wherein the indication of the MAC security configuration is based at least in part on the MAC security capability of the UE (block 720). For example, the BS (e.g., using transmit processor 220, controller/processor 240, memory 242, and/or the like) may transmit, to the UE, a communication that includes an indication of a MAC security configuration for communications between the UE and the BS, as described above. In some aspects, the indication of the MAC security configuration is based at least in part on the MAC security capability of the UE.

Process 700 may include additional aspects, such as any single implementation or any combination of aspects described below and/or in connection with one or more other processes described elsewhere herein.

In a first aspect, the indication of the MAC security configuration comprises an indication that MAC security is to be used for an entire MAC PDU transmitted between the UE and the BS, an indication that MAC security is to be used for all MAC sub-PDUs, included in the MAC PDU, that include a MAC-CE, or an indication that MAC security is to be used for a subset of the MAC sub-PDUs, included in the MAC PDU, that include a MAC-CE.

In a second aspect, alone or in combination with the first aspect, the communication includes one or more parameters unique to a DU of the BS. In a third aspect, alone or in combination with one or more of the first or second aspects, process 700 comprises generating, based at least in part on the one or more parameters unique to the DU, a DU key to be used for communications between the UE and the DU. In some aspects, generating the DU key comprises generating the DU key based at least in part on a BS key associated with the BS. In a fourth aspect, alone or in combination with one or more of the first through third aspects, generating the DU key comprises using the one or more parameters unique to the DU and the BS key in a key derivation function.

In a fifth aspect, alone or in combination with one or more of the first through fourth aspects, the one or more parameters unique to the DU comprises at least one of a PCI associated with the DU, a random number that is randomly generated by the DU, or an alphanumeric string. In a sixth aspect, alone or in combination with one or more of the first through fifth aspects, process 700 comprises generating, based at least in part on the DU key, a MAC encryption key associated with the DU and a MAC integrity key associated with the DU. In a seventh aspect, alone or in combination with one or more of the first through sixth aspects, process 700 comprises generating, based at least in part on the DU key, an RRC encryption key associated with the DU, an RRC integrity key associated with the DU, a MAC encryption key associated with the DU, and a MAC integrity key associated with the DU.

In an eighth aspect, alone or in combination with one or more of the first through seventh aspects, process 700 comprises generating, based at least in part on the DU key, a DU encryption key associated with the DU and a DU integrity key associated with the DU. In a ninth aspect, alone or in combination with one or more of the first through third aspects, process 700 comprises decrypting an RRC communication, received from the DU, based at least in part on a decryption algorithm in which the DU encryption key and an RRC input parameter is used, or encrypting a RRC communication, to be transmitted to the DU, based at least in part on an encryption algorithm in which the DU encryption key and the RRC input parameter is used.

In a tenth aspect, alone or in combination with one or more of the first through ninth aspects, process 700 comprises decrypting a MAC PDU communication, received from the DU, based at least in part on a decryption algorithm in which the DU encryption key and a MAC input parameter is used, or encrypting a MAC PDU communication, to be transmitted to the DU, based at least in part on an encryption algorithm in which the DU encryption key and the MAC input parameter is used. In an eleventh aspect, alone or in combination with one or more of the first through tenth aspects, process 700 comprises generating a message authentication code based at least in part on an integrity algorithm in which the DU encryption key and an RRC input parameter is used.

In a twelfth aspect, alone or in combination with one or more of the first through eleventh aspects, generating a message authentication code based at least in part on an integrity algorithm in which the DU encryption key and a MAC input parameter is used. In a thirteenth aspect, alone or in combination with one or more of the first through twelfth aspects, process 700 comprises receiving, from the UE, a MAC PDU, identifying a MAC security CE included in the MAC PDU, and identifying, based at least in part on the MAC security configuration, information, associated with MAC security of the MAC PDU, included in the MAC security CE.

In a fourteenth aspect, alone or in combination with one or more of the first through thirteenth aspects, the information associated with the MAC security of the MAC PDU comprises a MAC security sequence number associated with the MAC PDU. In a fifteenth aspect, alone or in combination with one or more of the first through fourteenth aspects, the indication of the MAC security configuration comprise an indication that MAC security is to be used for all MAC sub-PDUs, included in the MAC PDU, that include a MAC-CE. In a sixteenth aspect, alone or in combination with one or more of the first through fifteenth aspects, the information associated with the MAC security of the MAC PDU comprises an indication of a quantity of all MAC sub-PDUs, included in the MAC PDU, that include a MAC-CE and an indication of a combined length of all MAC sub-PDUs, included in the MAC PDU, that include a MAC-CE.

In a seventeenth aspect, alone or in combination with one or more of the first through sixteenth aspects, the indication of the MAC security configuration comprise an indication that MAC security is to be used for an entire MAC PDU transmitted between the UE and the BS. In an eighteenth aspect, alone or in combination with one or more of the first through seventeenth aspects, the information associated with the MAC security of the MAC PDU comprises an indication of a length of the MAC PDU. In a nineteenth aspect, alone or in combination with one or more of the first through eighteenth aspects, the indication of the MAC security configuration comprises an indication that MAC security is to be used for a subset of MAC sub-PDUs, included in the MAC PDU, that include a MAC-CE. In a twentieth aspect, alone or in combination with one or more of the first through nineteenth aspects, the information associated with the MAC security of the MAC PDU comprises an indication of a quantity of MAC sub-PDUs included in the subset of MAC sub-PDUs and an indication of a respective length of each MAC sub-PDU included in the subset of MAC sub-PDUs.

In a twenty-first aspect, alone or in combination with one or more of the first through twentieth aspects, process 700 comprises generating, for transmission to the UE, a MAC PDU, configuring, based at least in part on the MAC security configuration, a MAC security CE included in the MAC PDU, wherein the MAC security CE includes information associated with MAC security of the MAC PDU. In a twenty-second aspect, alone or in combination with one or more of the first through twenty-first aspects, the information associated with the MAC security of the MAC PDU comprises a MAC security sequence number associated with the MAC PDU.

In a twenty-third aspect, alone or in combination with one or more of the first through twenty-second aspects, the indication of the MAC security configuration comprises an indication that MAC security is to be used for all MAC sub-PDUs, included in the MAC PDU, that include a MAC-CE. In a twenty-fourth aspect, alone or in combination with one or more of the first through twenty-third aspects, the information associated with the MAC security of the MAC PDU comprises an indication of a quantity of all MAC sub-PDUs, included in the MAC PDU, that include a MAC-CE and an indication of a combined length of all MAC sub-PDUs, included in the MAC PDU, that include a MAC-CE. In a twenty-fifth aspect, alone or in combination with one or more of the first through twenty-fourth aspects, the indication of the MAC security configuration comprises an indication that MAC security is to be used for an entire MAC PDU transmitted between the UE and the BS. In a twenty-sixth aspect, alone or in combination with one or more of the first through twenty-fifth aspects, the information associated with the MAC security of the MAC PDU comprises an indication of a length of the MAC PDU.

In a twenty-seventh aspect, alone or in combination with one or more of the first through twenty-sixth aspects, the indication of the MAC security configuration comprises an indication that MAC security is to be used for a subset of MAC sub-PDUs, included in the MAC PDU, that include a MAC-CE. In a twenty-eighth aspect, alone or in combination with one or more of the first through twenty-seventh aspects, the information associated with the MAC security of the MAC PDU comprises an indication of a quantity of MAC sub-PDUs included in the subset of MAC sub-PDUs and an indication of a respective length of each MAC sub-PDU included in the subset of MAC sub-PDUs. In a twenty-ninth aspect, alone or in combination with one or more of the first through twenty-eighth aspects, transmitting the communication comprises transmitting the communication based at least in part on a handover being initiated between a first DU and a second DU.

In a thirtieth aspect, alone or in combination with one or more of the first through twenty-ninth aspects, the first DU is associated with the BS and the second DU is associated with the BS or another BS. In a thirty-first aspect, alone or in combination with one or more of the first through thirtieth aspects, the communication includes an indication to generate a DU key associated with the first DU. In a thirty-second aspect, alone or in combination with one or more of the first through thirty-first aspects, process 700 comprises generating the DU key associated with the first DU. In some aspects, the handover is an Xn-based handover. In a thirty-third aspect, alone or in combination with one or more of the first through thirty-second aspects, process 700 comprises generating a BS key and generating a DU key, associated with the first DU, based at least in part on the BS key. In a thirty-fourth aspect, alone or in combination with one or more of the first through thirty-third aspects, the communication comprises an RRC reconfiguration communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting, to a base station (BS), information indicating a medium access control (MAC) security capability of the UE;
    receiving, from the BS, a communication that includes an indication of a MAC security configuration for communications between the UE and the BS,
    wherein the indication of the MAC security configuration is based at least in part on the MAC security capability of the UE;
    generating a distributed unit (DU) key from a BS key based at least in part on the communication, wherein the DU key is associated with a DU of the BS and the BS key is associated with a central unit (CU) of the BS;
    generating a MAC encryption key and a MAC integrity key from the DU key; and
    using the MAC encryption key or the MAC integrity key to communicate with the BS.

2. The method of claim 1, wherein the indication of the MAC security configuration comprises:
    an indication that MAC security is to be used for an entire MAC protocol data unit (PDU) transmitted between the UE and the BS,
    an indication that MAC security is to be used for all MAC sub-PDUs, included in the MAC PDU, that include a MAC control element (MAC-CE), or
    an indication that MAC security is to be used for a subset of the MAC sub-PDUs, included in the MAC PDU, that include a MAC-CE.

3. The method of claim 1, wherein the communication includes one or more parameters unique to the DU; and
    wherein generating the DU key further comprises:
    generating, based at least in part on the one or more parameters unique to the DU, the DU key.

4. The method of claim 3, wherein the one or more parameters unique to the DU comprises at least one of:
    a physical cell identifier (PCI) associated with the DU,
    a random number that is randomly generated by the DU, or
    an alphanumeric string.

5. The method of claim 3, further comprising:
    generating, based at least in part on the DU key, at least one of:
    a radio resource control (RRC) encryption key associated with the DU,
    an RRC integrity key associated with the DU,
    a DU encryption key associated with the DU, or
    a DU integrity key associated with the DU.

6. The method of claim 3, further comprising:
    generating, based at least in part on the DU key:
    a DU encryption key associated with the DU, and
    a DU integrity key associated with the DU; and
    at least one of:
    decrypting a radio resource control (RRC) communication, received from the DU, based at least in part on a decryption algorithm in which the DU encryption key and an RRC input parameter are used,
    encrypting an RRC communication, to be transmitted to the DU, based at least in part on an encryption algorithm in which the DU encryption key and the RRC input parameter are used,
    decrypting a MAC protocol data unit (PDU) communication, received from the DU, based at least in part on a decryption algorithm in which the DU encryption key and a MAC input parameter are used, or
    encrypting a MAC PDU communication, to be transmitted to the DU, based at least in part on an encryption algorithm in which the DU encryption key and the MAC input parameter are used.

7. The method of claim 1, further comprising:
    receiving, from the BS, a MAC protocol data unit (PDU);
    identifying a MAC security control element (CE) included in the MAC PDU; and
    identifying, based at least in part on the MAC security configuration, information, associated with MAC security of the MAC PDU, included in the MAC security CE.

8. The method of claim 7, wherein the information associated with the MAC security of the MAC PDU comprises:

a MAC security sequence number associated with the MAC PDU.

9. The method of claim 7, wherein the indication of the MAC security configuration comprises:
an indication that MAC security is to be used for all MAC sub-PDUs, included in the MAC PDU, that include a MAC-CE; and
wherein the information associated with the MAC security of the MAC PDU comprises:
an indication of a quantity of all MAC sub-PDUs, included in the MAC PDU, that include a MAC-CE, and
an indication of a combined length of all MAC sub-PDUs, included in the MAC PDU, that include a MAC-CE.

10. The method of claim 7, wherein the indication of the MAC security configuration comprises:
an indication that MAC security is to be used for an entire MAC PDU transmitted between the UE and the BS; and
wherein the information associated with the MAC security of the MAC PDU comprises:
an indication of a length of the MAC PDU.

11. The method of claim 7, wherein the indication of the MAC security configuration comprises:
an indication that MAC security is to be used for a subset of MAC sub-PDUs, included in the MAC PDU, that include a MAC-CE; and
wherein the information associated with the MAC security of the MAC PDU comprises:
an indication of a quantity of MAC sub-PDUs included in the subset of MAC sub-PDUs, and
an indication of a respective length of each MAC sub-PDU included in the subset of MAC sub-PDUs.

12. The method of claim 1, further comprising:
generating, for transmission to the BS, a MAC protocol data unit (PDU); and
configuring, based at least in part on the MAC security configuration, a MAC security control element (CE) included in the MAC PDU,
wherein the MAC security CE includes information associated with MAC security of the MAC PDU.

13. The method of claim 12, wherein the information associated with the MAC security of the MAC PDU comprises:
a MAC security sequence number associated with the MAC PDU.

14. The method of claim 12, wherein the indication of the MAC security configuration comprises:
an indication that MAC security is to be used for all MAC sub-PDUs, included in the MAC PDU, that include a MAC-CE; and
wherein the information associated with the MAC security of the MAC PDU comprises:
an indication of a quantity of all MAC sub-PDUs, included in the MAC PDU, that include a MAC-CE, and
an indication of a combined length of all MAC sub-PDUs, included in the MAC PDU, that include a MAC-CE.

15. The method of claim 12, wherein the indication of the MAC security configuration comprises:
an indication that MAC security is to be used for an entire MAC PDU transmitted between the UE and the BS; and
wherein the information associated with the MAC security of the MAC PDU comprises:
an indication of a length of the MAC PDU.

16. The method of claim 12, wherein the indication of the MAC security configuration comprises:
an indication that MAC security is to be used for a subset of MAC sub-PDUs, included in the MAC PDU, that include a MAC-CE; and
wherein the information associated with the MAC security of the MAC PDU comprises:
an indication of a quantity of MAC sub-PDUs included in subset of the MAC sub-PDUs, and
an indication of a respective length of each MAC sub-PDU included in the subset of MAC sub-PDUs.

17. A method of wireless communication performed by a base station (BS), comprising:
receiving, from a user equipment (UE), information indicating a medium access control (MAC) security capability of the UE;
transmitting, to the UE, a communication that includes an indication of a MAC security configuration for communications between the UE and the BS,
wherein the indication of the MAC security configuration is based at least in part on the MAC security capability of the UE;
generating a distributed unit (DU) key from a BS key based at least in part on the communication, wherein the DU key is associated with a DU of the BS and the BS key is associated with a central unit (CU) of the BS;
generating a MAC encryption key and a MAC integrity key from the DU key; and
using the MAC encryption key or the MAC integrity key to communicate with the UE.

18. The method of claim 17, wherein the indication of the MAC security configuration comprises:
an indication that MAC security is to be used for an entire MAC protocol data unit (PDU) transmitted between the UE and the BS,
an indication that MAC security is to be used for all MAC sub-PDUs, included in the MAC PDU, that include a MAC control element (MAC-CE), or
an indication that MAC security is to be used for a subset of the MAC sub-PDUs, included in the MAC PDU, that include a MAC-CE.

19. The method of claim 17, wherein the communication includes one or more parameters unique to the DU; and
wherein generating the DU key further comprises:
generating, based at least in part on the one or more parameters unique to the DU, the DU key.

20. The method of claim 19, wherein the one or more parameters unique to the DU comprises at least one of:
a physical cell identifier (PCI) associated with the DU,
a random number that is randomly generated by the DU, or
an alphanumeric string.

21. The method of claim 19, further comprising:
generating, based at least in part on the DU key, at least one of:
a radio resource control (RRC) encryption key associated with the DU,
an RRC integrity key associated with the DU,
a DU encryption key associated with the DU, or
a DU integrity key associated with the DU.

22. The method of claim 19, further comprising:
generating, based at least in part on the DU key:
a DU encryption key associated with the DU, and
a DU integrity key associated with the DU; and
at least one of:
decrypting a radio resource control (RRC) communication, received from the DU, based at least in part on a decryption algorithm in which the DU encryption key and an RRC input parameter are used, encrypting an RRC communication, to be transmitted to the DU, based at least in part on an encryption algorithm in which the DU encryption key and the RRC input parameter are used, decrypting a MAC protocol data unit (PDU) communication, received from the DU, based at least in part on a decryption algorithm in which the DU encryption key and a MAC input parameter are used, or encrypting a MAC PDU communication, to be transmitted to the DU, based at least in part on an encryption algorithm in which the DU encryption key and the MAC input parameter are used.

23. The method of claim 17, further comprising:
receiving, from the UE, a MAC protocol data unit (PDU);
identifying a MAC security control element (CE) included in the MAC PDU; and
identifying, based at least in part on the MAC security configuration, information, associated with MAC security of the MAC PDU, included in the MAC security CE.

24. The method of claim 23, wherein the information associated with the MAC security of the MAC PDU comprises:
a MAC security sequence number associated with the MAC PDU.

25. The method of claim 23, wherein the indication of the MAC security configuration comprises:
an indication that MAC security is to be used for all MAC sub-PDUs, included in the MAC PDU, that include a MAC-CE; and
wherein the information associated with the MAC security of the MAC PDU comprises:
an indication of a quantity of all MAC sub-PDUs, included in the MAC PDU, that include a MAC-CE, and
an indication of a combined length of all MAC sub-PDUs, included in the MAC PDU, that include a MAC-CE.

26. The method of claim 23, wherein the indication of the MAC security configuration comprises:
an indication that MAC security is to be used for an entire MAC PDU transmitted between the UE and the BS; and
wherein the information associated with the MAC security of the MAC PDU comprises:
an indication of a length of the MAC PDU.

27. The method of claim 23, wherein the indication of the MAC security configuration comprises:
an indication that MAC security is to be used for a subset of MAC sub-PDUs, included in the MAC PDU, that include a MAC-CE; and
wherein the information associated with the MAC security of the MAC PDU comprises:
an indication of a quantity of MAC sub-PDUs included in the subset of MAC sub-PDUs, and
an indication of a respective length of each MAC sub-PDU included in the subset of MAC sub-PDUs.

28. The method of claim 17, further comprising:
generating, for transmission to the UE, a MAC protocol data unit (PDU); and
configuring, based at least in part on the MAC security configuration, a MAC security control element (CE) included in the MAC PDU,
wherein the MAC security CE includes information associated with MAC security of the MAC PDU.

29. The method of claim 28, wherein the information associated with the MAC security of the MAC PDU comprises:
a MAC security sequence number associated with the MAC PDU.

30. The method of claim 28, wherein the indication of the MAC security configuration comprises:
an indication that MAC security is to be used for all MAC sub-PDUs, included in the MAC PDU, that include a MAC-CE; and
wherein the information associated with the MAC security of the MAC PDU comprises:
an indication of a quantity of all MAC sub-PDUs, included in the MAC PDU, that include a MAC-CE, and
an indication of a combined length of all MAC sub-PDUs, included in the MAC PDU, that include a MAC-CE.

31. The method of claim 28, wherein the indication of the MAC security configuration comprises:
an indication that MAC security is to be used for an entire MAC PDU transmitted between the UE and the BS; and
wherein the information associated with the MAC security of the MAC PDU comprises:
an indication of a length of the MAC PDU.

32. The method of claim 28, wherein the indication of the MAC security configuration comprises:
an indication that MAC security is to be used for a subset of MAC sub-PDUs, included in the MAC PDU, that include a MAC-CE; and
wherein the information associated with the MAC security of the MAC PDU comprises:
an indication of a quantity of MAC sub-PDUs included in the subset of MAC sub-PDUs, and
an indication of a respective length of each MAC sub-PDU included in the subset of MAC sub-PDUs.

33. A user equipment (UE) for wireless communication, comprising:
a memory; and
one or more processors operatively coupled to the memory, the memory and the one or more processors configured to:
transmit, to a base station (BS), information indicating a medium access control (MAC) security capability of the UE;
receive, from the BS, a communication that includes an indication of a MAC security configuration for communications between the UE and the BS,
wherein the indication of the MAC security configuration is based at least in part on the MAC security capability of the UE;
generate a distributed unit (DU) key from a BS key based at least in part on the communication, wherein the DU key is associated with a DU of the BS and the BS key is associated with a central unit (CU) of the BS;
generate a MAC encryption key and a MAC integrity key from the DU key; and
use the MAC encryption key or the MAC integrity key to communicate with the BS.

34. The UE of claim 33, wherein the indication of the MAC security configuration comprises:
an indication that MAC security is to be used for an entire MAC protocol data unit (PDU) transmitted between the UE and the BS,
an indication that MAC security is to be used for all MAC sub-PDUs, included in the MAC PDU, that include a MAC control element (MAC-CE), or an indication that MAC security is to be used for a subset of the MAC sub-PDUs, included in the MAC PDU, that include a MAC-CE.

35. The UE of claim 33, wherein the communication includes one or more parameters unique to a distributed unit (DU) of the BS; and
wherein the one or more processors are further configured to:
generate, based at least in part on the one or more parameters unique to the DU, a DU key to be used for communications between the UE and the DU.

36. A base station (BS) for wireless communication, comprising:
a memory; and
one or more processors operatively coupled to the memory, the memory and the one or more processors configured to:
receive, from a user equipment (UE), information indicating a medium access control (MAC) security capability of the UE;
transmit, to the UE, a communication that includes an indication of a MAC security configuration for communications between the UE and the BS,
wherein the indication of the MAC security configuration is based at least in part on the MAC security capability of the UE;
generate a distributed unit (DU) key from a BS key based at least in part on the communication, wherein the DU key is associated with a DU of the BS and the BS key is associated with a central unit (CU) of the BS;
generate a MAC encryption key and a MAC integrity key from the DU key; and
use the MAC encryption key or the MAC integrity key to communicate with the UE.

37. The BS of claim 36, wherein the indication of the MAC security configuration comprises:
an indication that MAC security is to be used for an entire MAC protocol data unit (PDU) transmitted between the UE and the BS,
an indication that MAC security is to be used for all MAC sub-PDUs, included in the MAC PDU, that include a MAC control element (MAC-CE), or
an indication that MAC security is to be used for a subset of the MAC sub-PDUs, included in the MAC PDU, that include a MAC-CE.

38. The BS of claim 36, wherein the communication includes one or more parameters unique to the DU; and
wherein the one or more processors are further configured to:
generate, based at least in part on the one or more parameters unique to the DU, the DU key.

* * * * *